United States Patent
Sato et al.

(10) Patent No.: US 8,634,460 B2
(45) Date of Patent: *Jan. 21, 2014

(54) METHOD AND APPARATUS FOR CODING IMAGE INFORMATION, METHOD AND APPARATUS FOR DECODING IMAGE INFORMATION, METHOD AND APPARATUS FOR CODING AND DECODING IMAGE INFORMATION, AND SYSTEM OF CODING AND TRANSMITTING IMAGE INFORMATION

(71) Applicant: Sony Corporation, Tokyo (JP)

(72) Inventors: Kazushi Sato, Chiba (JP); Osamu Sunohara, Tokyo (JP); Teruhiko Suzuki, Chiba (JP); Peter Kuhn, Tokyo (JP); Yoichi Yagasaki, Tokyo (JP); Kuniaki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/706,862

(22) Filed: Dec. 6, 2012

(65) Prior Publication Data

US 2013/0094575 A1 Apr. 18, 2013

Related U.S. Application Data

(63) Continuation of application No. 13/370,174, filed on Feb. 9, 2012, now Pat. No. 8,351,501, which is a continuation of application No. 12/620,431, filed on Nov. 17, 2009, now Pat. No. 8,139,636, which is a continuation of application No. 11/836,467, filed on Aug. 9, 2007, now Pat. No. 7,733,955, which is a continuation of application No. 10/304,950, filed on Nov. 27, 2002, now Pat. No. 7,295,609.

(30) Foreign Application Priority Data

Nov. 30, 2001 (JP) .................................. 2001-367868
Apr. 25, 2002 (JP) .................................. 2002-124641

(51) Int. Cl.
*H04B 1/66* (2006.01)

(52) U.S. Cl.
USPC ............ 375/240.03; 375/240.25; 375/240.05; 375/240.26; 375/240.2; 375/240.18; 382/233; 382/235; 382/251; 382/250; 382/248

(58) Field of Classification Search
USPC ............ 375/240.03, 240.25, 240.05, 240.26, 375/240.2, 240.18; 382/233, 235, 251, 250, 382/248

See application file for complete search history.

(56) References Cited

U.S. PATENT DOCUMENTS 6,385,242 B1 * 5/2002 Chen ........................ 375/240.03
6,385,247 B1   5/2002 De With et al.

(Continued)

FOREIGN PATENT DOCUMENTS

JP            11-243545           9/1999

OTHER PUBLICATIONS

U.S. Appl. No. 13/707,083, filed Dec. 6, 2012, Sato, et al.

(Continued)

*Primary Examiner* — Shawn An
(74) *Attorney, Agent, or Firm* — Oblon, Spivak, McClelland, Maier & Neustadt, L.L.P.

(57) ABSTRACT

A decoding method decodes a bit stream in an image decoding apparatus. The method includes decoding, in a decoding unit in the image decoding apparatus, the bit stream, and generating a luma component of quantized coefficients and a chroma component of quantized coefficients. The method also includes performing, in a dequantization unit in the image decoding apparatus, dequantization on the luma component of quantized coefficients and the chroma component of quantized coefficients using a chroma quantization parameter calculated on the basis of a luma quantization parameter weighted by an addition operation.

2 Claims, 22 Drawing Sheets

(56) References Cited

U.S. PATENT DOCUMENTS

| | | | |
|---|---|---|---|
| 6,445,739 B1 | 9/2002 | Shen et al. | |
| 6,654,418 B2 * | 11/2003 | Haskell et al. | 375/240.03 |
| 6,834,080 B1 * | 12/2004 | Furukawa et al. | 375/240.02 |
| 6,999,512 B2 * | 2/2006 | Yoo et al. | 375/240.03 |
| 7,733,955 B2 * | 6/2010 | Sato et al. | 375/240.03 |
| 8,139,636 B2 * | 3/2012 | Sato et al. | 375/240.03 |
| 8,144,767 B2 | 3/2012 | Sato et al. | |
| 8,265,143 B2 * | 9/2012 | Sato et al. | 375/240.03 |
| 8,351,501 B2 * | 1/2013 | Sato et al. | 375/240.03 |
| 2012/0287991 A1 * | 11/2012 | Sato et al. | 375/240.03 |
| 2012/0287992 A1 * | 11/2012 | Sato et al. | 375/240.03 |

OTHER PUBLICATIONS

U.S. Appl. No. 13/706,981, filed Dec. 6, 2012, Sato, et al.
U.S. Appl. No. 13/707,147, filed Dec. 6, 2012, Sato, et al.
U.S. Appl. No. 13/706,892, filed Dec. 6, 2012, Sato, et al.
U.S. Appl. No. 13/706,772, filed Dec. 6, 2012, Sato, et al.
U.S. Appl. No. 13/706,815, filed Dec. 6, 2012, Sato, et al.
VCEG, "Low complexity (I) DCT", VCEG-N43, ITU-Telecommunications Standardization Sector, Sep. 2001, pp. 1-4.
U.S. Appl. No. 13/881,927, filed Apr. 26, 2013, Sato.

* cited by examiner

FIG. 3

| +0 | +0 | +1 | +1 |
| +0 | +1 | +1 | +2 |
| +1 | +1 | +2 | +2 |
| +1 | +2 | +2 | +3 |

FIG. 4

| +0 | +0 | +0 | +0 |
| +0 | +0 | +0 | +0 |
| +0 | +0 | +0 | +0 |
| +0 | +0 | +0 | +0 |

FIG. 5

| QQP | −8 | −7 | −6 | −5 | −4 | −3 | −2 | −1 | 0 |
|---|---|---|---|---|---|---|---|---|---|
| LENGTH OF A( ) | 11 | 11 | 11 | 11 | 10 | 10 | 10 | 10 | 10 |
| MAX LEVEL | 1010 | 901 | 805 | 719 | 642 | 573 | 511 | 456 | 408 |
| BIT LENGTH | 11 | 11 | 11 | 11 | 11 | 11 | 10 | 10 | 10 |

FIG. 6

```
picture_header() {
    picture_startcode
    ..
    quantizer_range                                              (2 bits)
    quant_matrix_extension()
    ..
} quant_matrix_extension() {
    load_intra_quantiser_matrix                                  (1 bit)
    if(load_intra_quantiser_matrix) {
        intra_quantiser_matrix[16]                               (4*16 bits)
    }
    load_non_intra_quantiser_matrix                              (1 bit)
    if(load_non_intra_quantiser_matrix) {
        non_intra_quantiser_matrix[16]                           (4*16 bits)
    }
    load_chroma_intra_quantiser_matrix                           (1 bit)
    if(load_chroma_intra_quantiser_matrix) {
        chroma_intra_quantiser_matrix[16]                        (4*16 bits)
    }
    load_non_intra_quantiser_matrix                              (1 bit)
    if(load_chroma_non_intra_quantiser_matrix) {
        chroma_non_intra_quantiser_matrix[16]                    (4*16 bits)
    }
}
```

FIG. 7

| quantizer_range | bit length | QQP |
|---|---|---|
| 0 | A():10-bit,10-bit quantized coefficients | 8<=QQP<=39 |
| 1 | A():10-bit,10-bit quantized coefficients | 6<=QQP<=43 |
| 2 | A():10-bit,11-bit quantized coefficients | 4<=QQP<=43 |
| 3 | A():11-bit,11-bit quantized coefficients | 0<=QQP<=43 |

FIG. 8

```
quant_matrix_extension() {
        load_intra_quantiser_matrix                    1 bit
        if(load_intra_quantiser_matrix) {
                intra_quantiser_matrix[16]             4*16 bits
        }
        load_non_intra_quantiser_matrix                1 bit
        if(load_non_intra_quantiser_matrix) {
                non_intra_quantiser_matrix[16]         4*16 bits
        }
        load_chroma_intra_quantiser_matrix             1 bit
        if(load_intra_quantiser_matrix) {
                intra_quantiser_matrix[16]             4*16 bits
        }
        load_chroma_non_intra_quantiser_matrix         1 bit
        if(load_non_intra_quantiser_matrix) {
                non_intra_quantiser_matrix[16]         4*16 bits
        }
        load_luma_dc_quantiser_matrix                  1 bit
        if(load_luma_dc_quantiser_matrix) {
                luma_dc_quantiser_matrix[16]           4*16 bits
        }
        load_chroma_dc_quantiser_matrix                1 bit
        if(load_chroma_dc_quantiser_matrix) {
                chroma_dc_quantiser_matrix[4]          4*16 bits
        }
}
```

FIG. 9

```
quant_matrix_extension() {
        load_intra_quantiser_matrix                        uvlc
        if(load_intra_quantiser_matrix) {
                intra_quantiser_matrix[16]                 uvlc
        }
        load_non_intra_quantiser_matrix                    uvlc
        if(load_non_intra_quantiser_matrix) {
                non_intra_quantiser_matrix[16]             uvlc
        }
        load_chroma_intra_quantiser_matrix                 uvlc
        if(load_intra_quantiser_matrix) {
                intra_quantiser_matrix[16]                 uvlc
        }
        load_chroma_non_intra_quantiser_matrix             uvlc
        if(load_non_intra_quantiser_matrix) {
                non_intra_quantiser_matrix[16]             uvlc
        }
        load_luma_dc_quantiser_matrix                      uvlc
        if(load_luma_dc_quantiser_matrix) {
                luma_dc_quantiser_matrix[16]               uvlc
        }
        load_chroma_dc_quantiser_matrix                    uvlc
        if(load_chroma_dc_quantiser_matrix) {
                chroma_dc_quantiser_matrix[4]              uvlc
        }
}
```

FIG. 10

```
group_of_picture_header() {
            :
            :
            quant_matrix_extension()
}
```

FIG. 11

| | |
|---|---|
| quant_matrix_extension() { | |
|     intra_quantiser_matrix[16] | 4*16 bits |
|     non_intra_quantiser_matrix[16] | 4*16 bits |
|     intra_quantiser_matrix[16] | 4*16 bits |
|     non_intra_quantiser_matrix[16] | 4*16 bits |
|     luma_dc_quantiser_matrix[16] | 4*16 bits |
|     chroma_dc_quantiser_matrix[4] | 4*4 bits |
| } | |

FIG. 12

```
quant_matrix_extension() {
    intra_quantiser_matrix[16]              uvlc
    non_intra_quantiser_matrix[16]          uvlc
    intra_quantiser_matrix[16]              uvlc
    non_intra_quantiser_matrix[16]          uvlc
    luma_dc_quantiser_matrix[16]            uvlc
    chroma_dc_quantiser_matrix[4]           uvlc
}
```

FIG. 14

```
group_of_picture_header() {
        :
        :
        DC_quant_weight        4 bits
}
```

FIG. 15

```
picture_header() {
        :
        :
        DC_quant_weight        4 bits
}
```

FIG. 21

| INTRA DC PRECISION | ACCURACY IN BITS | DEQUANTIZATION COEFFICIENT (intra_dc_mult) | DC PREDICTION RESET VALUE |
|---|---|---|---|
| 0 | 8 | 8 | 128 |
| 1 | 9 | 4 | 256 |
| 2 | 10 | 2 | 512 |
| 3 | 11 | 1 | 1024 |

FIG. 22

| 8 | 16 | 19 | 22 | 26 | 27 | 29 | 34 |
|---|----|----|----|----|----|----|----|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

FIG. 23

| 16 | 16 | 16 | 16 | 16 | 16 | 16 | 16 |
|----|----|----|----|----|----|----|----|
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |

FIG. 24

| 16 | 17 | 18 | 19 | 20 | 21 | 22 | 23 |
|----|----|----|----|----|----|----|----|
| 17 | 18 | 19 | 20 | 21 | 22 | 23 | 24 |
| 18 | 19 | 20 | 21 | 22 | 23 | 24 | 25 |
| 19 | 20 | 21 | 22 | 23 | 24 | 26 | 27 |
| 20 | 21 | 22 | 23 | 25 | 26 | 27 | 28 |
| 21 | 22 | 23 | 24 | 26 | 27 | 28 | 30 |
| 22 | 23 | 24 | 26 | 28 | 28 | 30 | 31 |
| 23 | 24 | 25 | 27 | 30 | 30 | 31 | 33 |

FIG. 25

| quantiser_scale_code | quantiser_scale[q_scale_type] | |
|---|---|---|
| | q_scale_type=0 | q_sacle_type=1 |
| 0 | (forbidden) | |
| 1 | 2 | 1 |
| 2 | 4 | 2 |
| 3 | 6 | 3 |
| 4 | 8 | 4 |
| 5 | 10 | 5 |
| 6 | 12 | 6 |
| 7 | 14 | 7 |
| 8 | 16 | 8 |
| 9 | 18 | 10 |
| 10 | 20 | 12 |
| 11 | 22 | 14 |
| 12 | 24 | 16 |
| 13 | 26 | 18 |
| 14 | 28 | 20 |
| 15 | 30 | 22 |
| 16 | 32 | 24 |
| 17 | 34 | 28 |
| 18 | 36 | 32 |
| 19 | 38 | 36 |
| 20 | 40 | 40 |
| 21 | 42 | 44 |
| 22 | 44 | 48 |
| 23 | 46 | 52 |
| 24 | 48 | 56 |
| 25 | 50 | 64 |
| 26 | 52 | 72 |
| 27 | 54 | 80 |
| 28 | 56 | 88 |
| 29 | 58 | 96 |
| 30 | 60 | 104 |
| 31 | 62 | 112 |

METHOD AND APPARATUS FOR CODING IMAGE INFORMATION, METHOD AND APPARATUS FOR DECODING IMAGE INFORMATION, METHOD AND APPARATUS FOR CODING AND DECODING IMAGE INFORMATION, AND SYSTEM OF CODING AND TRANSMITTING IMAGE INFORMATION

CROSS-REFERENCE TO RELATED APPLICATIONS

This application is a continuation of application Ser. No. 13/370,174, filed Feb. 9, 2012, which is a continuation of application Ser. No. 12/620,431, filed Nov. 17, 2009, which is a continuation of application Ser. No. 11/836,467, filed Aug. 9, 2007, now U.S. Pat. No. 7,733,955, which is a continuation of application Ser. No. 10/304,950, filed Nov. 27, 2002, now U.S. Pat. No. 7,295,609, the entire contents of each of which is incorporated herein by reference. This application also claims priority to Japanese Patent Application Nos. 2001-367868, filed Nov. 30, 2001, and 2002-124641, filed Apr. 25, 2002.

BACKGROUND OF THE INVENTION

1. Field of the Invention

The present invention relates to a method and apparatus for coding image information, a method and apparatus for decoding image information, a method and apparatus for coding and decoding image information, and a system for coding and transmitting image information, for use in receiving, via a network medium such as satellite broadcasting, cable television, or the Internet, image information (bit stream) compressed by means of an orthogonal transform such as a discrete cosine transform or a Karhunen-Loeve transform and motion compensation according to the MPEG (Moving Picture Experts Group) standard or the standard H.26x, or for use in processing image information on a storage medium such as an optical disk, a magnetic disk, or a flash memory.

2. Description of the Related Art

In recent years, techniques of transmitting or storing digital image information in a highly compressed form have been popular in various apparatuses used in information distribution such as broadcasting and also in home use apparatuses. In a typical technique based on the MPEG standard, image information is compressed using redundancy of the image information by means of an orthogonal transform such as a discrete cosine transform and motion compensation.

MPEG2 (ISO/IEC13818-2) is a standard for general-purpose image information coding. The MPEG2 standard is designed to deal with image information in various forms and fashions such as an interlaced image, a sequentially scanned image, a standard-resolution image, and a high-resolution image, and the MPEG2 is employed in a wide range of applications including professional applications and consumer applications. The MPEG2 compression scheme allows an interlaced standard-resolution image with 720×480 pixels to be converted into a compressed image at a bit rate of 4 to 8 Mbps and an interlaced high-resolution image with 1920×1088 pixels to be converted into a compressed image at a bit rate of 18 to 22 Mbps, with a high compression ratio while maintaining high image quality.

The MPEG2 standard has been designed to code image information with high quality for use mainly in broadcasting, and the MPEG2 standard does not support coding at lower bit rates (higher compression rates) than are supported by the MPEG1 standard. That is, coding with very high compression ratios is not supported by the MPEG2 standard. However, with increasing popularity of portable terminals, there is an increasing need for coding with high compression ratios at low bit rates. To meet such a need, MPEG4 standard has been established. The image information coding scheme based on MPEG4 was employed as an international standard (ISO/IEC 14 496-2) in December 1998.

In recent years, work for establishing the H.26L standard (ITU-T Q6/16 VCEG) for coding of image information for use in video conferences has been done. It is known that the H.26L standard provides high coding efficiency compared with the conventional coding schemes such as MPEG2 or MPEG4 coding, although H.26L needs a greater amount of computation in coding and decoding. As one of activities associated with MPEG4, efforts are now being made to establish a higher-compression coding standard (Joint Model of Enhanced-Compression Video Coding) based on H.26L, which will support some functions which are not supported by the H.26L standard.

Referring to FIG. 19, a conventional image information coding apparatus using an orthogonal transform such as a discrete cosine transform or a Karhunen-Loeve transform and motion compensation is described below.

As shown in FIG. 19, the conventional image information coding apparatus 201 includes an analog-to-digital converter 211, a frame rearrangement buffer 212, an adder 213, an orthogonal transformer 214, a quantizer 215, a lossless coder 216, a storage buffer 217, a dequantizer 218, an inverse orthogonal transformer 219, a frame memory 220, a motion prediction compensator 221, and a rate controller 222.

In FIG. 19, the analog-to-digital converter 211 converts an input image signal into a digital signal. The frame rearrangement buffer 212 rearranges frames depending on the GOP (Group of Pictures) structure of the compressed image information output from the image information coding apparatus 201. When the frame rearrangement buffer 212 receives a frame to be intra-coded, the frame rearrangement buffer 212 supplies the image information of the entire frame to the orthogonal transformer 214. The orthogonal transformer 214 performs an orthogonal transform such as a discrete cosine transform or a Karhunen-Loeve transform on the image information and supplies resultant transform coefficients to the quantizer 215. The quantizer 215 quantizes the transform coefficients received from the orthogonal transformer 214.

The lossless coder 216 performs lossless coding by means of variable length coding or arithmetic coding on the quantized transform coefficients and supplies the resultant coded transform coefficients to the storage buffer 217. The storage buffer 217 stores the received coded transform coefficients. The coded transform coefficients are output as compressed image information from the storage buffer 18.

The behavior of the quantizer 215 is controlled by the rate controller 222. The quantizer 215 also supplies the quantized transform coefficients to the dequantizer 218. The dequantizer 218 dequantizes the received transform coefficients. The inverse orthogonal transformer 219 performs an inverse orthogonal transform on the dequantized transform coefficients thereby producing decoded image information and stores the resultant decoded image information into the frame memory 220.

On the other hand, image information of those frames to be interframe-coded is supplied from the frame rearrangement buffer 212 to the motion prediction compensator 221. At the same time, the motion prediction compensator 221 reads image information to be referred to from the frame memory 220 and performs motion prediction compensation to produce reference image information. The motion prediction compensator 221 supplies the reference image information to the adder 213. The adder 213 produces a difference signal indicating the difference between the image information and the reference image information. At the same time, the motion prediction compensator 221 also supplies the motion vector information to the lossless coder 216.

The lossless coder 216 performs lossless coding by means of variable length coding or arithmetic coding on the motion vector information thereby producing information to be put in a header of the compressed image information. The other processes are performed in a similar manner to compressed image information to be intra-coded, and thus they are not described herein in further detail.

Referring to FIG. 20, an image information decoding apparatus corresponding to the above image information coding apparatus 201 is described below.

As shown in FIG. 20, the image information decoding apparatus 241 includes a storage buffer 251, a lossless decoder 252, a dequantizer 253, an inverse orthogonal transformer 254, an adder 255, a frame rearrangement buffer 256, a digital-to-analog converter 257, a motion prediction compensator 258, and a frame memory 259.

In FIG. 20, compressed image information input to the storage buffer 251 is transferred to the lossless decoder 252 after being temporarily stored in the storage buffer 251. The lossless decoder 252 decodes the received compressed image information by means of variable length decoding or arithmetic decoding in accordance with the format of the compressed image information and supplies the resultant quantized transform coefficients to the dequantizer 253. In a case in which the frame supplied to the lossless decoder 252 is an interframe-coded frame, the lossless decoder 252 also decodes the motion vector information described in the header of the compressed image information and supplies the resultant decoded information to the motion prediction compensator 258.

The dequantizer 253 dequantizes the quantized transform coefficients supplied from the lossless decoder 252 and supplies the resultant transform coefficients to the inverse orthogonal transformer 254. The inverse orthogonal transformer 254 performs an inverse orthogonal transform such as an inverse discrete cosine transform or an inverse Karhunen-Loeve transform on the transform coefficients in accordance with the predetermined format of the compressed image information.

In a case in which a given frame is an intra-coded frame, the image information subjected to the inverse orthogonal transform is stored in the frame rearrangement buffer 256. The image information stored in the frame rearrangement buffer 256 is supplied to the digital-to-analog converter 257, which converts the received image information into analog form and outputs the resultant analog image information.

On the other hand, in a case in which the frame being processed is an interframe-coded frame, the motion prediction compensator 258 produces an reference image on the basis of the motion vector information subjected to the lossless decoding process and the image information stored in the frame memory 259. The resultant reference image is supplied to the adder 255. The adder 255 adds the received reference image to the output of the inverse orthogonal transformer 254. The other processes are performed in a similar manner to intraframe-coded frames, and thus they are not described in further detail herein.

The MPEG2 standard does not include detailed definition of quantization, and only dequantization is defined in detail. Therefore, in practical quantization processing, quantization characteristics are varied by varying some parameters associated with quantization so as to achieve high image quality or accomplish coding so as to reflect visual characteristics. The dequantization process according to the MPEG2 standard is described below.

In quantization of DC coefficients of intra macroblocks according to the MPEG2 video standard, the quantization accuracy can be specified on a picture-by-picture basis. In quantization of the other coefficients, the quantization accuracy of each coefficient can be controlled by multiplying each element of a quantization matrix, which can be specified on a picture-by-picture basis, by a quantization scale which can be specified on a macroblock-by-macroblock basis.

DC coefficients of each intra macroblock are dequantized in accordance with equation (1) described below.

$$F''[0][0] = \text{intra\_dc\_mult} \times QF[0][0] \qquad (1)$$

In equation (1), F'''[0][0] denotes a representative quantization value of a DC coefficient, and QF[0][0] denotes a level number of the representative quantization value of the DC coefficient. intra_dc_mult denotes a value which is defined, as shown in FIG. 21, depending on a parameter intra_dc_precision which can be set to specify the quantization accuracy of DC coefficients on the picture-by-picture basis.

In the MPEG1 standard, intra_dc_precision is allowed only to be 0, and the corresponding accuracy (B bits) is not high enough to code an image whose luminance level varies gradually while maintaining high image quality. In the MPEG2, to avoid the above problem, quantization accuracy for DC coefficients as high as 8 to 11 bits can be specified via intra_dc_precision, as shown in FIG. 21. However, the highest quantization accuracy is allowed only in the 4:2:2: format, and the quantization accuracy is limited to the range from 8 to 10 bits except for the high profile for use in applications which need high image quality.

The other coefficients of each intra macroblock are dequantized in accordance with equation (2) described below.

$$F'''[u][v] = ((2 \times QF[u][v] + k) \times W[w][u][v]) \times \text{quantiser\_scale})/32 \qquad (2)$$

In equation (2), F'''[u][v] denotes a representative quantization value of a (u, v)-coefficient and QF[u][v] denotes a level number of the representative quantization value of the (u, v)-coefficient. The value of k is given by the following equation (3).

$$k = \begin{cases} 0: & \text{for intra macroblocks} \\ \text{Sign}(QF[u][v]): & \text{for non-intra macroblock} \end{cases} \qquad (3)$$

In equation (2) described above, W[w] [u][v] denotes a quantization matrix and quantiser_scale denotes a quantization scale. The quantization characteristic are controlled by those parameters.

The parameter k has a value of 1, 0, or −1 in non-intra macroblocks, depending on the sign of QF[u][v]. For example, when QF[u][v] has a value of −2, −1, 0, 1, or 2, F'''[u][v] has a value of −5m, −3m, 0, 3m, or 5m (where m is a constant). Thus, there is a dead zone near 0.

The quantization matrix defines relative quantization accuracy for discrete cosine coefficients within a block. Use of the quantization matrix allows discrete cosine coefficients to be quantized with a greater quantization step in a high-frequency range, in which a large quantization step does not result in significant visually perceptible degradation, than in a low-frequency range in which a large quantization step results in visually perceptible degradation. That is, it becomes possible to vary the quantization characteristic so as to match the visual characteristics. The quantization matrix can be set on a picture-by-picture basis.

In the case of the 4:2:0 format according to MPEG1 or MPEG2, two types of quantization matrices can be set: one is for intra macroblocks and the other for non-intra macroblocks. In the 4:2:2 format and the 4:4:4 format, two types of quantization matrices can be defined independently for each of the luminance signal and the color difference signal, and thus a total of four quantization matrices can be defined. w(0, 1, 2, 3) in W[w][u][v] denotes one of 4 matrices.

In the MPEG2 standard, the default values of the quantization matrix for intra macroblocks are defined as shown in FIG. 22, and those for non-intra macroblocks as shown in FIG. 23. As described earlier, the quantization matrices can be set on the picture-by-picture basis. However, when no quantization matrix is set, the default values described above are employed. When the default values are employed, as can be seen from FIGS. 22 and 23, weighting is performed only for intra macroblocks.

In the MPEG2 Test Model 5 (ISO/IEC JTC/SC29/WG11/N0400), the quantization matrix for non-intra macroblocks are defined as shown in FIG. 24. Unlike the quantization matrix shown in FIG. 22, the quantization matrix shown in FIG. 24 has weighted values.

A parameter quantiser_scale is a parameter to control the amount of data generated by quantization, by scaling the quantization characteristic, wherein the quantization scale is given by a parameter quantiser_scale which is determined by a parameter q_scale_type set on the picture-by-picture basis and a parameter quantiser_scale_code set on the macroblock-by-macroblock basis. FIG. 25 shows the relationships among those parameters.

As shown in FIG. 25, when q_scale_type=0, quantization is performed in a linear fashion. In this case, as with MPEG1, quantiser_scale (2 to 62) is set to be equal to 2 times quantiser_scale_code (1 to 31).

On the other hand, when q_scale_type=1, quantization is performed in a nonlinear fashion. In this mode, quantiser_scale is varied in small steps when quantiser_scale_code has a small value while quantiser_scale is varied in large steps when quantiser_scale_code has a large value, and thus quantiser_scale_code (1 to 31) is converted into quantiser_scale having a greater range (1 to 112) than in the linear quantization. This mode was newly introduced when the MPEG2 standard was established to make it possible to perform fine control of the quantization scale in a small quantization scale range at high rates, and to employ a large quantization scale when a very complicated image is coded. That is, the mode of q_scale_type=1 allows the bit rate to be controlled in a more optimal fashion than can be by MPEG1.

In H.26L, in contrast to MPEG2, coding is performed on the basis of 4×4 discrete cosine transform. More specifically, when quantized pixel values or quantized difference pixel values are given as (a, b, c, d), and transform coefficients are given as (A, B, C, D), a discrete cosine transform is performed in accordance with the following formula.

$$\begin{cases} A = 13a + 13b + 13c + 13d \\ B = 17a + 7b - 7c + 17d \\ C = 13a - 13b - 13c + 13d \\ D = 7a - 17b + 17c - 7d \end{cases} \quad (4)$$

If coefficients obtained via the transform are represented by (a', b', c', d'), processing corresponding to an inverse discrete cosine transform is performed according to equation (5).

$$\begin{cases} a' = 13A + 17B + 13C + 7D \\ b' = 13A + 7B - 13C - 17D \\ c' = 13A - 7B - 13C + 17D \\ d' = 13A - 17B + 13C - 7D \end{cases} \quad (5)$$

Thus, between a' and a, there is a relationship represented by equation (6).

$$a' = 676a \quad (6)$$

The relationship between a' and a represented by equation (6) arises from the fact that equations (4) and (5) are not normalized. Normalization is performed when a shift operation is performed after dequantization, as will be described in detail later.

In H.26L, a parameter QP used in quantization and dequantization is defined such that QP takes a value in the range of 0 to 31 and the quantization step size is increased by 12% each time QP increases by 1. In other words, the quantization step size increases by a factor of 2 each time QP increases by 6.

The values of QP embedded in compressed image information are for the luminance signal, and thus they are denoted by $QP_{luma}$. On the other hand, in contrast to $QP_{luma}$, QP for the color difference signal, that is, $QP_{chroma}$ takes following values.

$QP_{luma}$: 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31

$QP_{chroma}$: 0, 1, 2, 3, 4, 5, 6, 7, 8, 9, 10, 11, 12, 13, 14, 15, 16, 17, 17, 18, 19, 20, 20, 21, 22, 22, 23, 23, 24, 24, 25, 26

Hereinafter, $QP_{luma}$ will be referred to simply as QP unless distinction is necessary.

In H.26L, two arrays A(QP) and B(QP) for use in quantization/dequantization are defined as described below.

A(QP=0, . . . , 31): 620, 553, 492, 439, 391, 348, 310, 276, 246, 219, 195, 174, 155, 138, 123, 110, 98, 87, 78, 69, 62, 55, 49, 44, 39, 35, 31, 27, 24, 22, 19, 17

B(QP=0, . . . , 31): 3881, 4351, 4890, 5481, 6154, 6914, 7761, 8718, 10987, 12339, 13828, 1 5523, 17435, 19561, 21873, 24552, 27656, 30847, 34870, 38807, 43747, 491 03, 54683, 61694, 68745, 77615, 89113, 100253, 109366, 126635, 141533

Between the arrays A(QP) and B(QP), there is a relationship represented by equation (7).

$$A(QP) \times B(QP) \times 676^2 = 2^{40} \quad (7)$$

Using the array A(QP) in equation (7), the coefficient K is quantized according to equation (8).

$$\text{LEVEL} = (K \times A(QP) + f \times 2^{20})/2^{20} \quad (8)$$

In equation (8), |f| has a value in the range of 0 to 0.5, wherein the sign of f is equal to the that of K.

Dequantization is performed as shown in equation (9).

$$K' = \text{LEVEL} \times B(QP)$$

After calculating equation (9), 20-bit shifting and rounding are performed on the coefficient K'. The sequential process including the orthogonal transform and the quantization is designed such that no overflow occurs when the process is performed in 32 bits.

Note that the standard for the quantization/dequantization is provisional, and the overflow-free data length will probably be 16 bits in the final version of the standard.

In quantization/dequantization according to the H.26L standard, unlike the MPEG2 standard, weighting of orthogonal transform coefficients using a quantization matrix is not allowed, and thus it is impossible to efficiently perform quantization on the basis of visual characteristics.

The above-described quantization according to the H.26L corresponds to MPEG2-based quantization: 2.5019, 2.8050, 3.1527, 3.5334, 3.9671, 4.4573, 5.0037, 5.6201, and 6.3055. However, in the MPEG2, the dynamic range of the nonlinear quantization is 1 to 112, and thus the range of quantization according to MPEG2 cannot be entirely covered by quantization according to H.26L.

This causes a spurious contour line to be created in an image including a part whose pixel value varies gradually. Another problem is that high-efficient compression is impossible at low bit rates.

In view of the above, it is an object of the present invention to provide a technique of preventing a spurious contour line from being created in an image including a part with gradually varying pixel values and a technique of performing high-efficient compression at low bit rates.

SUMMARY OF THE INVENTION

According to an aspect of the present invention, there is provided a first image information coding apparatus/method for coding image information by dividing an input image signal into blocks, performing an orthogonal transform on the blocks on a block-by-block basis, and quantizing orthogonal transform coefficients, wherein, in the quantization, weighting is performed for each component of the orthogonal transform coefficients by means of an addition operation on a parameter QP specifying one of elements of a series of numbers arranged in accordance with a predetermined rule in correspondence with quantization step sizes.

In this first image information coding apparatus/method, preferably, an array $A(QP)$ consisting of elements having values which increase or decrease by a % with increasing of the value of the parameter QP by 1 is used as the sequence of numbers corresponding to the quantization step sizes, and in the quantization, the orthogonal transform coefficients K are multiplied by the values of the array $A(QP)$ and the resultant product is quantized.

In this first image information coding apparatus/method, when the parameter QP exceeds an upper limit or a lower limit, the array $A(QP)$ may be extended so as to have an extended value or values determined on the basis of the increasing or decreasing ratio of the original array $A(QP)$, and the extended value or values of the $A(QP)$ may be used for the exceeding value or values of the parameter QP.

That is, in this first image information coding apparatus/method, the quantization is performed such that the orthogonal transform coefficient is first multiplied by the value of the array $A(QP)$ and then the resultant product is quantized, wherein QP is a parameter specifying one of elements of a series of numbers arranged in accordance with a predetermined rule in correspondence with quantization step sizes and the value of the array $A(QP)$ increases or decreases by a % with increasing of the value of the parameter QP by 1.

When the parameter QP exceeds an upper limit or a lower limit, the array $A(QP)$ may be extended so as to have an extended value or values determined on the basis of the increasing or decreasing ratio of the original array $A(QP)$, and the extended value or values of the $A(QP)$ may be used for the exceeding value or values of the parameter QP.

The parameter QP may include a parameter $QP_{luma}$ applied to a luminance signal and a parameter $QP_{chroma}$ applied to a color difference signal, and the quantization may be performed such that a parameter $QQP_{luma}(i, j)$ is calculated by adding a weighting array $W(i, j)$ to the array of the parameter $QP_{luma}$ corresponding to the respective components of the luminance signal of each block, a parameter $QQP_{chroma}(i, j)$ is calculated by adding the weighting array $W(i, j)$ to the array of the parameter $QP_{chroma}$ corresponding to the respective components of the color difference signal of each block, and quantization weighting is performed using the resultant parameter $QQP_{luma}(i, j)$ and the resultant parameter $QQP_{chroma}(i, j)$.

When the parameter $QQP_{chroma}(i, j)$ obtained via the calculation exceeds a predetermined value $QQP_{chroma\_max}$, the weighted quantization may be performed using the predetermined value $QQP_{chroma\_max}$ as the parameter $QQP_{chroma}(i, j)$.

In the first image information coding method/apparatus, the quantization may be performed such that two arrays $A(QP)$ and $B(QP)$ corresponding to the parameter QP and having the following relationship are prepared $A(QP) \times B(QP) =$ Const, where Const denotes a constant, the quantization is performed in accordance with the following formula $$LEVEL = (K \times A(QP) + f \times 2^m)/2^m$$

where K denotes an unquantized orthogonal transform coefficient, m denotes a predetermined integer, f denotes a rounding constant, LEVEL denotes a quantized output, dequantization corresponding to the quantization is to be performed in accordance with the following formula $$K' = LEVEL \times B(QP)$$

where K' denotes a dequantized orthogonal transform coefficient, and wherein when the parameter $QQP_{chroma}(i, j)$ obtained via the calculation exceeds the predetermined value $QQP_{chroma\_max}$, a common ration is calculated in accordance with the following formula $$\frac{A(QP)}{A(QP+1)} = \frac{B(QP+1)}{B(QP)} = r$$

a variable $A(QQP_{chroma}(i, j) > QQP_{chroma\_max}$ and a variable $B(QQP_{chroma}(i, j) > QQP_{chrom\_max}$ are respectively calculated in accordance with the following formulas $$A(QQP_{chroma}(i, j) > QQP_{chroma\_max}) =$$
$$\text{round}\left(\frac{A(QQP_{chroma\_max})}{r^{QQP_{chroma}(i,j) - QQP_{chroma\_max}}}\right)$$

$$B(QQP_{chroma}(i, j) > QQP_{chroma\_max}) =$$
$$\text{round}(A(QQP_{chroma\_max}) \times r^{QQP_{chroma}(i,j) - QQP_{chroma\_max}}$$

where round( ) denotes a round-into-integer function, and the quantization is performed in accordance with the following formula $$\text{LEVEL}=(K \times A(QQP_{chroma}(i,j) > QQP_{chroma\_max}) + f \times 2^m)/2^m.$$

According to another aspect of the present invention, there is provided a second image information coding method/apparatus for coding image information by dividing an input image signal into first blocks, performing a first orthogonal transform on the first blocks on a block-by-block basis, forming second blocks including only DC components of orthogonal transform coefficients obtained via the first orthogonal transform, and performing a second orthogonal transform on the second blocks; and quantizing the coefficients of AC components obtained via the first orthogonal transform and quantizing the coefficients of the DC component obtained via the second orthogonal transform, wherein, in the quantization, coefficients of the AC components obtained via the first orthogonal transform are weighted differently from the coefficients of the DC components obtained via the second orthogonal transform.

In this second image information coding method/apparatus, coefficients of DC components obtained via the first orthogonal transform are extracted, and the second orthogonal transform is performed on the extracted coefficients, and the coefficients of AC components obtained via the first orthogonal transform and the coefficients of DC components obtained via the second orthogonal transform are quantized in weighted fashion such that the coefficients of AC components are weighted differently from the coefficients of DC components.

In the second image information coding method/apparatus, the quantization of the coefficients of the AC components may be performed using, as the parameter QP, a parameter $QP_{luma}$ for a luminance signal and a parameter $QP_{chroma}$ for a color difference signal, and the quantization of the coefficients of the DC components may be performed using, as the parameter QQP, a parameter $QQP_{luma}(i, j)$ for the luminance signal and a parameter $QQP_{chroma}(i, j)$ for the color difference signal, wherein the parameter $QQP_{luma}(i, j)$ is obtained by adding a weighting array W(i, j) as the parameter X to the array of the parameter $QP_{luma}$ corresponding to the respective components of the luminance signal of each block, and the parameter $QQP_{chroma}(i, j)$ is obtained by adding the array W(i, j) as the parameter X to the array of the parameter $QP_{chroma}$ corresponding to the respective components of the color difference signal of each block.

When the parameter $QQP_{chroma}(i, j)$ obtained via the calculation exceeds the predetermined value $QQP_{chroma\_max}$, the quantization of the coefficients of DC components may be performed using the predetermined value $QQP_{chroma\_max}$ as the parameter $QQP_{chroma}(i, j)$.

In the second image information coding method/apparatus, the quantization may be performed such that two arrays A(QP) and B(QP) corresponding to the parameter QP and having the following relationship are prepared $A(QP) \times B(QP) = $Const, where Const denotes a constant, the quantization of the coefficients of AC components is performed in accordance with the following formula $$\text{LEVEL}=(K \times A(QP) + f \times 2^m)/2^m$$

where K denotes an unquantized orthogonal transform coefficient, m denotes a predetermined integer, f denotes a rounding constant, LEVEL denotes a quantized output, dequantization of the coefficients of AC components, corresponding to the quantization, is to be performed in accordance with the following formula $$K' = \text{LEVEL} \times B(QP)$$

where K' denotes a dequantized orthogonal transform coefficient, and wherein when the parameter $QQP_{chroma}(i, j)$ obtained via the calculation exceeds the predetermined value $QQP_{chroma\_max}$, a common ration is calculated in accordance with the following formula $$\frac{A(QP)}{A(QP+1)} = \frac{B(QP+1)}{B(QP)} = r$$

a variable $A(QQP_{chroma}(i, j) > QQP_{chroma\_max}$ and a variable $B(QQP_{chroma}(i, j) > QQP_{chroma\_max}$ are respectively calculated in accordance with the following formulas $$A(QQP_{chroma}(i, j) > QQP_{chroma\_max}) = \text{round}\left(\frac{A(QQP_{chroma\_max})}{r^{QQP_{chroma}(i,j) - QQP_{chroma\_max}}}\right)$$

$$B(QQP_{chroma}(i, j) > QQP_{chroma\_max}) = \text{round}(A(QQP_{chroma\_max}) \times r^{QQP_{chroma}(i,j) - QQP_{chroma\_max}}$$

where round( ) denotes a round-into-integer function, and the quantization is performed in accordance with the following formula $$\text{LEVEL}=(K \times A(QQP_{chroma}(i,j) > QQP_{chroma\_max}) + f \times 2^m)/2^m.$$

According to another aspect of the present invention, there is provided a first image information decoding method/apparatus for decoding compressed image information which has been coded via a process including the steps of dividing an input image signal into blocks, performing an orthogonal transform on the blocks on a block-by-block basis, and quantizing resultant orthogonal transform coefficients, the decoding process including the steps of performing dequantization and performing an inverse orthogonal transform, wherein, in the dequantization, weighted dequantization is performed on each component of the quantized coefficients by means of an addition operation on a parameter QP specifying one of elements of a series of numbers arranged in accordance with a predetermined rule in correspondence with quantization step sizes.

In this first image information decoding method/apparatus, an array B(QP) consisting of elements having values which increase or decrease by β% with increasing of the value of the parameter QP by 1 may be used as the sequence of numbers corresponding to the quantization step sizes, and the dequantization may be performed by multiplying the quantized coefficients by the values of the array B(QP).

In this first image information decoding method/apparatus, when the parameter QP exceeds an upper limit or a lower limit, the array B(QP) may be extended so as to have an extended value or values determined on the basis of the increasing or decreasing ratio of the original array B(QP), and the extended value or values of the B(QP) may be used for the exceeding value or values of the parameter QP.

That is, in this first image information decoding method/apparatus, the dequantization is performed such that the quantized coefficient is multiplied by the value of the array B(QP), wherein QP is a parameter specifying one of elements of a series of numbers arranged in accordance with a predetermined rule in correspondence with quantization step sizes, and the value of the array B(QP) increases or decreases by β% with increasing of the value of the parameter QP by 1.

When the parameter QP exceeds an upper limit or a lower limit, the array B(QP) may be extended so as to have an extended value or values determined on the basis of the increasing or decreasing ratio of the original array B(QP), and the extended value or values of the B(QP) may be used for the exceeding value or values of the parameter QP.

The parameter QP may include a parameter OP luma applied to a luminance signal and a parameter $QP_{chroma}$ applied to a color difference signal, and the dequantization may be performed such that a parameter $QQP_{luma}(i, j)$ is calculated by adding a weighting array $W(i, j)$ to the array of the parameter $QP_{luma}$ corresponding to the respective components of the luminance signal of each block, a parameter $QQP_{chroma}(i, j)$ is calculated by adding the weighting array $W(i, j)$ to the array of the parameter $QP_{chroma}$ corresponding to the respective components of the color difference signal of each block, and weighted dequantization is performed using the resultant parameter $QQP_{luma}(i, j)$ and the resultant parameter $QQP_{chroma}(i, j)$.

When the parameter $QQP_{chroma}(i, j)$ obtained via the calculation exceeds a predetermined value $QQP_{chroma\_max}$, the weighted dequantization may be performed using the predetermined value $QQP_{chroma\_max}$ as the parameter $QQP_{chroma}(i, j)$.

In the first image information decoding method/apparatus, when compressed image information is given which has been coded such that two arrays A(QP) and B(QP) corresponding to the parameter QP and having the following relationship were prepared $$A(QP) \times B(QP) = \text{Const, where Const denotes a constant,}$$

the quantization was performed in accordance with the following formula $$\text{LEVEL} = (K \times A(QP) + f \times 2^m)/2^m$$

where K denotes an unquantized orthogonal transform coefficient, m denotes a predetermined integer, f denotes a rounding constant, LEVEL denotes a quantized output, the dequantization is performed in the following formula $$K' = \text{LEVEL} \times B(QP)$$

where K' denotes a dequantized orthogonal transform coefficient, wherein when the parameter $QQP_{chroma}(i, j)$ obtained via the calculation exceeds the predetermined value $QQP_{chroma\_max}$, a common ration is calculated in accordance with the following formula $$\frac{A(QP)}{A(QP+1)} = \frac{B(QP+1)}{B(QP)} = r$$

a variable $A(QQP_{chroma}(i, j) > QQP_{chroma\_max}$ and a variable $B(QQP_{chroma}(i, j) > QQP_{chroma\_max}$ are respectively calculated in accordance with the following formulas $$A(QQP_{chroma}(i, j) > QQP_{chroma\_max}) = \text{round}\left(\frac{A(QQP_{chroma\_max})}{r^{QQP_{chroma}(i,j) - QQP_{chroma\_max}}}\right)$$

-continued
$$B(QQP_{chroma}(i, j) > QQP_{chroma\_max}) = \text{round}(A(QQP_{chroma\_max}) \times r^{QQP_{chroma}(i,j) - QQP_{chroma\_max}})$$

where round( ) denotes a round-into-integer function, and the dequantization is performed in accordance with the following formula $$K' = \text{LEVEL} \times B(QQP_{chroma}(i,j) > QQP_{chroma\_max})$$

where $\text{LEVEL} = (K \times A(QQP_{chroma}(i, j) > QQP_{chroma\_max}) + f \times 2^m)/2^m$.

According to an aspect of the present invention, there is provided a second image information decoding method/apparatus for decoding an input image signal which has been coded via a process including the steps of dividing an input image signal into first blocks, performing a first orthogonal transform on the first blocks on a block-by-block basis, forming second blocks including only DC components of orthogonal transform coefficients obtained via the first orthogonal transform, and performing a second orthogonal transform on the second blocks; and quantizing the coefficients of AC components obtained via the first orthogonal transform and the coefficients of DC components obtained via the second orthogonal transform such that the coefficients of the AC components obtained via the orthogonal transform were weighted differently from the coefficients of the DC components obtained via the second orthogonal transform, wherein the decoding process includes the step of dequantizing the quantized coefficients of AC components and the coefficients of DC components quantized after completion of the second orthogonal transform such that the quantized coefficients of AC components and the coefficients of DC components are weighted differently by amounts corresponding to the weights employed in the quantization.

In this second image information decoding method/apparatus, as described above, when compressed image information is given which has been quantized such that coefficients of DC components obtained via the first orthogonal transform were extracted, and the second orthogonal transform was performed on the extracted coefficients, and the coefficients of AC components obtained via the first orthogonal transform and the coefficients of DC components obtained via the second orthogonal transform were quantized in weighted fashion such that the coefficients of AC components were weighted differently from the coefficients of DC components, the dequantization of the given image information may be performed such that the quantized coefficients of AC components and the coefficients of DC components quantized after being subjected to the second orthogonal transform are respectively dequantized with different weights corresponding to the weights employed in the quantization.

Furthermore, in the second image information decoding method/apparatus, the dequantization of the coefficients of the AC components may be performed using, as the parameter QP, a parameter $QP_{luma}$ for a luminance signal and a parameter $QP_{chroma}$ for a color difference signal, and the dequantization of the coefficients of the DC components may be performed using, as the parameter QQP, a parameter $QQP_{luma}(i, j)$ for the luminance signal and a parameter $QQP_{chroma}(i, j)$ for the color difference signal, wherein the parameter $QQP_{luma}(i, j)$ is obtained by adding a weighting array $W(i, j)$ as the parameter X to the array of the parameter $QP_{luma}$ corresponding to the respective components of the luminance signal of each block, and the parameter $QQP_{chroma}(i, j)$ is obtained by adding the array $W(i, j)$ as the parameter X to the array of the parameter $QP_{chroma}$ corresponding to the respective components of the color difference signal of each block.

When the parameter $QQP_{chroma}(i, j)$ obtained via the calculation exceeds the predetermined value $QQP_{chroma\_max}$, the dequantization of the coefficients of DC components may be performed using the predetermined value $QQP_{chroma\_max}$ as the parameter $QQP_{chroma}(i, j)$.

In the second image information decoding method/apparatus, when compressed image information is given which has been coded such that two arrays A(QP) and B(QP) corresponding to the parameter QP and having the following relationship were prepared $$A(QP) \times B(QP) = \text{Const, where Const denotes a constant,}$$

the quantization of the coefficients of AC components was performed in accordance with the following formula $$\text{LEVEL} = (K \times A(QP) + f \times 2^m)/2^m$$

where K denotes an unquantized orthogonal transform coefficient, m denotes a predetermined integer, f denotes a rounding constant, LEVEL denotes a quantized output, the dequantization of the coefficients of AC components is performed in the following formula $$K' = \text{LEVEL} \times B(QP)$$

where K' denotes a dequantized orthogonal transform coefficient, wherein when the parameter $QQP_{chroma}(i, j)$ obtained via the calculation exceeds the predetermined value $QQP_{chroma\_max}$, a common ration is calculated in accordance with the following formula $$\frac{A(QP)}{A(QP+1)} = \frac{B(QP+1)}{B(QP)} = r$$

a variable $A(QQP_{chroma}(i, j) > QQP_{chroma\_max}$ and a variable $B(QQP_{chroma}(i, j) > QQP_{chroma\_max}$ are respectively calculated in accordance with the following formulas $$A(QQP_{chroma}(i, j) > QQP_{chroma\_max}) =$$
$$\text{round}\left(\frac{A(QQP_{chroma\_max})}{r^{QQP_{chroma}(i,j)-QQP_{chroma\_max}}}\right)$$

$$B(QQP_{chroma}(i, j) > QQP_{chroma\_max}) =$$
$$\text{round}(A(QQP_{chroma\_max}) \times r^{QQP_{chroma}(i,j)-QQP_{chroma\_max}})$$

and the dequantization of the coefficients of DC components is performed in accordance with the following formula $$K' = \text{LEVEL} \times B(QQP_{chroma}(i,j) > QQP_{chroma\_max})$$

where $\text{LEVEL} = (K \times A(QQP_{chroma}(i, j) > QQP_{chroma\_max}) + f \times 2^m)/2^m$.

The first image information decoding apparatus may be such an image information decoding apparatus which decodes by performing dequantization and an inverse orthogonal transform on given compressed image information which has been coded via a process including the steps of dividing an input image signal into blocks, performing an orthogonal transform on the blocks on a block-by-block basis, and quantizing resultant orthogonal transform coefficients, wherein the image information decoding apparatus includes dequantization means for performing the dequantization such that weighted dequantization is performed on each component of the quantized coefficients by means of an addition operation on a parameter QP specifying one of elements of a series of numbers arranged in accordance with a predetermined rule in correspondence with quantization step sizes.

In the first image information decoding apparatus, an array B(QP) consisting of elements having values which increase or decrease by β% with increasing of the value of the parameter QP by 1 may be used as the sequence of numbers corresponding to the quantization step sizes, and the dequantization may be performed by multiplying the quantized coefficients by the values of the array B(QP).

In the first image information decoding apparatus, when the parameter QP exceeds an upper limit or a lower limit, the array B(QP) may be extended so as to have an extended value or values determined on the basis of the increasing or decreasing ratio of the original array B(QP), and the extended value or values of the B(QP) may be used for the exceeding value or values of the parameter QP.

That is, in the first image information decoding apparatus, the dequantization is performed such that the quantized coefficient is multiplied by the value of the array B(QP), wherein QP is a parameter specifying one of elements of a series of numbers arranged in accordance with a predetermined rule in correspondence with quantization step sizes, and the value of the array B(QP) increases or decreases by β% with increasing of the value of the parameter QP by 1.

When the parameter QP exceeds an upper limit or a lower limit, the array B(QP) may be extended so as to have an extended value or values determined on the basis of the increasing or decreasing ratio of the original array B(QP), and the extended value or values of the B(QP) may be used for the exceeding value or values of the parameter QP.

The parameter QP may include a parameter $QP_{luma}$ applied to a luminance signal and a parameter $QP_{chroma}$ applied to a color difference signal, and the dequantization means may include first calculation means and second calculation means wherein the first calculation means calculates a parameter $QQP_{luma}(i, j)$ by adding a weighting array W(i, j) to the array of the parameter $QP_{luma}$ corresponding to the respective components of the luminance signal of each block, and the second calculation means calculates a parameter $QQP_{chroma}(i, j)$ by adding the weighting array W(i, j) to the array of the parameter $QP_{chroma}$ corresponding to the respective components of the color difference signal of each block, and wherein the dequantization means performs weighted dequantization using the parameter $QQP_{luma}(i, j)$ calculated by the first calculation means and the parameter $QQP_{chroma}(i, j)$ calculated by the second calculation means.

When the parameter $QQP_{chroma}(i, j)$ calculated by the second calculation means exceeds a predetermined value $QQP_{chroma\_max}$, the dequantization means may perform weighted dequantization using the predetermined value $QQP_{chroma\_max}$ as the parameter $QQP_{chroma}(i, j)$.

In the first image information decoding apparatus, when compressed image information is given which has been coded such that two arrays A(QP) and B(QP) corresponding to the parameter QP and having the following relationship were prepared $$A(QP) \times B(QP) = \text{Const, where Const denotes a constant,}$$

the quantization was performed in accordance with the following formula $$\text{LEVEL} = (K \times A(QP) + f \times 2^m)/2^m$$

where K denotes an unquantized orthogonal transform coefficient, m denotes a predetermined integer, f denotes a rounding constant, LEVEL denotes a quantized output, the dequantization means may perform dequantization in accordance with the following formula $$K' = \text{LEVEL} \times B(QP)$$

where K' denotes a dequantized orthogonal transform coefficient, wherein when the parameter $QQP_{chroma}(i, j)$ calculated by the second calculation means exceeds the predetermined value $QQP_{chroma\_max}$, the dequantization means may dequantization such that a common ration is calculated in accordance with the following formula $$\frac{A(QP)}{A(QP+1)} = \frac{B(QP+1)}{B(QP)} = r$$

a variable $A(QQP_{chroma}(i, j) > QQP_{chroma\_max}$ and a variable $B(QQP_{chroma}(i, j) > QQP_{chroma\_max}$ are respectively calculated in accordance with the following formulas $$A(QQP_{chroma}(i, j) > QQP_{chroma\_max}) = \text{round}\left(\frac{A(QQP_{chroma\_max})}{r^{QQP_{chroma}(i,j) - QQP_{chroma\_max}}}\right)$$

$$B(QQP_{chroma}(i, j) > QQP_{chroma\_max}) = \text{round}(A(QQP_{chroma\_max}) \times r^{QQP_{chroma}(i,j) - QQP_{chroma\_max}}$$

where round( ) denotes a round-into-integer function, and the dequantization is performed in accordance with the following formula $$K' = \text{LEVEL} \times B(QQP_{chroma}(i,j) > QQP_{chroma\_max})$$

where $\text{LEVEL} = (K \times A(QQP_{chroma}(i, j) > QQP_{chroma\_max}) + f \times 2^m)/2^m$.

The second image information decoding apparatus may be such an image information decoding apparatus for decoding an input image signal which has been coded via a process including the steps of dividing an input image signal into first blocks, performing a first orthogonal transform on the first blocks on a block-by-block basis, forming second blocks including only DC components of orthogonal transform coefficients obtained via the first orthogonal transform, and performing a second orthogonal transform on the second blocks; and quantizing the coefficients of AC components obtained via the first orthogonal transform and the coefficients of DC components obtained via the second orthogonal transform such that the coefficients of the AC components obtained via the first orthogonal transform were weighted differently from the coefficients of the DC components obtained via the second orthogonal transform, wherein the apparatus includes dequantization means for dequantizing the quantized coefficients of AC components and the coefficients of DC components quantized after completion of the second orthogonal transform such that the quantized coefficients of AC components and the coefficients of DC components are weighted differently by amounts corresponding to the weights employed in the quantization.

In the second image information decoding apparatus, when compressed image information is given which has been quantized such that coefficients of DC components obtained via the first orthogonal transform were extracted, and the second orthogonal transform was performed on the extracted coefficients, and the coefficients of AC components obtained via the first orthogonal transform and the coefficients of DC components obtained via the second orthogonal transform were quantized in weighted fashion such that the coefficients of AC components were weighted differently from the coefficients of DC components, the dequantization of the given image information may be performed such that the quantized coefficients of AC components and the coefficients of DC components quantized after being subjected to the second orthogonal transform are respectively dequantized with different weights corresponding to the weights employed in the quantization.

Furthermore, in the second image information decoding apparatus, the dequantization means may dequantize the coefficients of the AC components using, as the parameter QP, a parameter $QP_{luma}$ for a luminance signal and a parameter $QP_{chroma}$ for a color difference signal, wherein the second image information decoding apparatus may further include first calculation means and second calculation means, the first calculation means serving to calculate a parameter $QQP_{luma}(i, j)$ as the parameter QQP to be applied to the luminance signal by adding a weighting array $W(i, j)$ as the parameter X to the array of the parameter $QP_{luma}$ corresponding to the respective components of the luminance signal of each block, the second calculation means serving to calculate a parameter $QQP_{chroma}(i, j)$ as the parameter QQP to be applied to the color difference signal by adding the array $W(i, j)$ as the parameter X to the array of the parameter $QP_{chroma}$ corresponding to the respective components of the luminance signal of each block, and wherein the dequantization means performs weighted dequantization using the parameter $QQP_{luma}(i,j)$ calculated by the first calculation means and the parameter $QQP_{chroma}(i, j)$ calculated by the second calculation means.

When the parameter $QQP_{chroma}(i, j)$ calculated by the second calculation means exceeds a predetermined value $QQP_{chroma\_max}$, the dequantization means may perform weighted dequantization using the predetermined value $QQP_{chroma\_max}$ as the parameter $QQP_{chroma}(i, j)$.

In the second image information decoding apparatus, when compressed image information is given which has been coded such that two arrays A(QP) and B(QP) corresponding to the parameter QP and having the following relationship were prepared $$A(QP) \times B(QP) = \text{Const, where Const denotes a constant,}$$

the quantization of the coefficients of AC components was performed in accordance with the following formula $$\text{LEVEL} = (K \times A(QP) + f \times 2^m)/2^m$$

where K denotes an unquantized orthogonal transform coefficient, m denotes a predetermined integer, f denotes a rounding constant, LEVEL denotes a quantized output, the dequantization means may perform dequantization of the coefficients of AC components in the following formula $$K' = \text{LEVEL} \times B(QP)$$

where K' denotes a dequantized orthogonal transform coefficient, wherein when the parameter $QQP_{chroma}(i, j)$ calculated by the second calculation means exceeds the predetermined value $QQP_{chroma\_max}$, the dequantization means may perform dequantization such that a common ration is calculated in accordance with the following formula $$\frac{A(QP)}{A(QP+1)} = \frac{B(QP+1)}{B(QP)} = r$$

a variable $A(QQP_{chroma}(i, j) > QQP_{chroma\_max})$ and a variable $B(QQP_{chroma}(i, j) > QQP_{chroma\_max})$ are respectively calculated in accordance with the following formulas $$A(QQP_{chroma}(i, j) > QQP_{chroma\_max}) = \mathrm{round}\left(\frac{A(QQP_{chroma\_max})}{r^{QQP_{chroma}(i,j)-QQP_{chroma\_max}}}\right)$$

$$B(QQP_{chroma}(i, j) > QQP_{chroma\_max}) = \mathrm{round}(A(QQP_{chroma\_max}) \times r^{QQP_{chroma}(i,j)-QQP_{chroma\_max}})$$

where round( ) denotes a round-into-integer function, and the dequantization of the coefficients of DC components is performed in accordance with the following formula $$K'=\mathrm{LEVEL} \times B(QQP_{chroma}(i,j) > QQP_{chroma\_max})$$

where $\mathrm{LEVEL}=(K \times A(QQP_{chroma}(i, j) > QQP_{chroma\_max})+f \times 2^m)/2^m$.

According to an aspect of the present invention, there is provided a first image information coding and transmitting system comprising: an image signal coder for producing compressed image information by dividing an input image signal into blocks, performing an orthogonal transform on the blocks on a block-by-block basis, and quantizing resultant orthogonal transform coefficient and also producing header information; and a multiplex packetizer for, when the compressed image information and the header information are received from the image signal coder, multiplexing the compressed image information and the header information in accordance with a predetermined method and transmitting the resultant multiplexed information in the form of packets, wherein when the image signal coder quantizes orthogonal transform coefficients obtained via the orthogonal transform, the image signal coder performs weighted quantization on each component of the orthogonal transform coefficients by means of an addition operation on a parameter QP specifying one of elements of a series of numbers arranged in accordance with a predetermined rule in correspondence with quantization step sizes; and the multiplex packetizer multiplexes information associated with the quantization weighting together with the header information and packetizes the multiplexed information.

In this first image information coding and transmitting system, the parameter QP may include a parameter $QP_{luma}$ applied to a luminance signal and a parameter $QP_{chroma}$ applied to a color difference signal; and the image signal coder may perform weighted quantization such that a parameter $QQP_{luma}(i, j)$ is calculated by adding a weighting array $W(i, j)$ to the array of the parameter $QP_{luma}$ corresponding to the respective components of the luminance signal of each block, a parameter $QQP_{chroma}(i,j)$ is calculated by adding the weighting array $W(i, j)$ to the array of the parameter $QP_{chroma}$ corresponding to the respective components of the color difference signal of each block, and weighted quantization is performed using the resultant parameter $QQP_{luma}(i,j)$ and the resultant parameter $QQP_{chroma}(i, j)$.

When the parameter $QQP_{chroma}(i, j)$ obtained via the calculation exceeds a predetermined value $QQP_{chroma\_max}$, the image signal coder may perform weighted quantization using the predetermined value $QQP_{chroma\_max}$ as the parameter $QQP_{chroma}(i, j)$.

The image information coding apparatus may perform coding such that two arrays $A(QP)$ and $B(QP)$ corresponding to the parameter QP and having the following relationship are prepared $A(QP) \times B(QP) = \mathrm{Const}$, where Const denotes a constant, the quantization is performed in accordance with the following formula $\mathrm{LEVEL}=(K \times A(QP)+f \times 2^m)/2^m$ where K denotes an unquantized orthogonal transform coefficient, m denotes a predetermined integer, f denotes a rounding constant, LEVEL denotes a quantized output, dequantization corresponding to the quantization is to be performed in accordance with the following formula $K'=\mathrm{LEVEL} \times B(QP)$ where K' denotes a dequantized orthogonal transform coefficient, wherein when the parameter $QQP_{chroma}(i, j)$ obtained via the calculation exceeds the predetermined value $QQP_{chroma\_max}$, a common ration is calculated in accordance with the following formula $$\frac{A(QP)}{A(QP+1)} = \frac{B(QP+1)}{B(QP)} = r$$

a variable $A(QQP_{chroma}(i, j) > QQP_{chroma\_max})$ and a variable $B(QQP_{chroma}(i, j) > QQP_{chroma\_max})$ are respectively calculated in accordance with the following formulas $$A(QQP_{chroma}(i, j) > QQP_{chroma\_max}) = \mathrm{round}\left(\frac{A(QQP_{chroma\_max})}{r^{QQP_{chroma}(i,j)-QQP_{chroma\_max}}}\right)$$

$$B(QQP_{chroma}(i, j) > QQP_{chroma\_max}) = \mathrm{round}(A(QQP_{chroma\_max}) \times r^{QQP_{chroma}(i,j)-QQP_{chroma\_max}})$$

where round( ) denotes a round-into-integer function, and
the quantization is performed in accordance with the following formula $\mathrm{LEVEL}=(K \times A(QQP_{chroma}(i,j) > QQP_{chroma\_max})+f \times 2^m)/2^m$.

As described above, the first image information coding and transmitting system includes an image signal coder for producing compressed image information by dividing an input image signal into blocks, performing an orthogonal transform on the blocks on a block-by-block basis, and quantizing resultant orthogonal transform coefficient and also producing header information; and a multiplex packetizer for, when the compressed image information and the header information are received from the image signal coder, multiplexing the compressed image information and the header information in accordance with a predetermined method and transmitting the resultant multiplexed information in the form of packets.

In this first image information coding and transmitting system, as described above, when the image signal coder quantizes orthogonal transform coefficients obtained via the orthogonal transform, the image signal coder performs weighted quantization on each component of the orthogonal transform coefficients by means of an addition operation on a parameter QP specifying one of elements of a series of numbers arranged in accordance with a predetermined rule in correspondence with quantization step sizes; and the multiplex packetizer multiplexes information associated with the quantization weighting together with the header information and packetizes the multiplexed information.

According to an aspect of the present invention, there is provided a second image information coding and transmitting system comprising an image signal coder for producing compressed image information by dividing an input image signal into blocks, performing an orthogonal transform on the blocks on a block-by-block basis, and quantizing resultant orthogonal transform coefficient and also producing header information; and a multiplex packetizer for, when the compressed image information and the header information are received from the image signal coder, multiplexing the compressed image information and the header information in accordance with a predetermined method and transmitting the resultant multiplexed information in the form of packets, wherein the multiplex packetizer adds at least the header information to each access unit, at the beginning thereof, of the compressed image information.

In this second image information coding and transmitting system, the parameter QP may include a parameter $QP_{luma}$ applied to a luminance signal and a parameter $QP_{chroma}$ applied to a color difference signal, and the image signal coder may perform weighted quantization such that a parameter $QQP_{luma}(i, j)$ is calculated by adding a weighting array $W(i, j)$ to the array of the parameter $QP_{luma}$ corresponding to the respective components of the luminance signal of each block, a parameter $QQP_{chroma}(i, j)$ is calculated by adding the weighting array $W(i, j)$ to the array of the parameter $QP_{chroma}$ corresponding to the respective components of the color difference signal of each block, and weighted quantization is performed using the resultant parameter $QQP_{luma}(i, j)$ and the resultant parameter $QQP_{chroma}(i, j)$.

When the parameter $QQP_{chroma}(i, j)$ obtained via the calculation exceeds a predetermined value $QQP_{chroma\_max}$, the image signal coder may perform weighted quantization using the predetermined value $QQP_{chroma\_max}$ as the parameter $QQP_{chroma}(i, j)$.

The image information coding apparatus may perform coding such that two arrays $A(QP)$ and $B(QP)$ corresponding to the parameter QP and having the following relationship are prepared $A(QP) \times B(QP) = \text{Const}$, where Const denotes a constant, the quantization is performed in accordance with the following formula $\text{LEVEL} = (K \times A(QP) + f \times 2^m)/2^m$ where K denotes an unquantized orthogonal transform coefficient, m denotes a predetermined integer, f denotes a rounding constant, LEVEL denotes a quantized output, dequantization corresponding to the quantization is to be performed in accordance with the following formula $K' = \text{LEVEL} \times B(QP)$ where K' denotes a dequantized orthogonal transform coefficient, wherein when the parameter $QQP_{chroma}(i, j)$ obtained via the calculation exceeds the predetermined value on $QQP_{chroma\_max}$, a common ration is calculated in accordance with the following formula $$\frac{A(QP)}{A(QP+1)} = \frac{B(QP+1)}{B(QP)} = r$$

a variable $A(QQP_{chroma}(i, j) > QQP_{chroma\_max}$ and a variable $B(QQP_{chroma}(i, j) > QQP_{chroma\_max}$ are respectively calculated in accordance with the following formulas $$A(QQP_{chroma}(i, j) > QQP_{chroma\_max}) = \\ \text{round}\left(\frac{A(QQP_{chroma\_max})}{r^{QQP_{chroma}(i,j) - QQP_{chroma\_max}}}\right)$$

$$B(QQP_{chroma}(i, j) > QQP_{chroma\_max}) = \\ \text{round}(A(QQP_{chroma\_max}) \times r^{QQP_{chroma}(i,j) - QQP_{chroma\_max}})$$

where round( ) denotes a round-into-integer function, and the quantization is performed in accordance with the following formula $\text{LEVEL} = (K \times A(QQP_{chroma}(i, j) > QQP_{chroma\_max}) + f \times 2^m)/2^m$.

As described above, the second image information coding and transmitting system includes an image signal coder for producing compressed image information by dividing an input image signal into blocks, performing an orthogonal transform on the blocks on a block-by-block basis, and quantizing resultant orthogonal transform coefficient and also producing header information; and a multiplex packetizer for, when the compressed image information and the header information are received from the image signal coder, multiplexing the compressed image information and the header information in accordance with a predetermined method and transmitting the resultant multiplexed information in the form of packets, wherein the multiplex packetizer adds at least the header information to each access unit, at the beginning thereof, of the compressed image information.

According to an aspect of the present invention, there is provided a third image information coding and transmitting system comprising an image signal coder for producing compressed image information by dividing an input image signal into blocks, performing an orthogonal transform on the blocks on a block-by-block basis, and quantizing resultant orthogonal transform coefficient and also producing header information; and a multiplex packetizer for, when the compressed image information and the header information are received from the image signal coder, multiplexing the compressed image information and the header information in accordance with a predetermined method and transmitting the resultant multiplexed information in the form of packets, wherein when the image signal coder quantizes orthogonal transform coefficients obtained via the orthogonal transform, the image signal coder performs weighted quantization on each component of the orthogonal transform coefficients by means of an addition operation on a parameter QP specifying one of elements of a series of numbers arranged in accordance with a predetermined rule in correspondence with quantization step sizes; and the multiplex packetizer multiplexes information associated with the quantization weighting together with the header information, packetizing the resultant multiplexed information separately from the compressed image information, and transmits the resultant packetized information and the compressed image information separately via different channels.

In this third image information coding and transmitting system, the parameter QP may include a parameter $QP_{luma}$ applied to a luminance signal and a parameter $QP_{chroma}$ applied to a color difference signal; and the image signal coder may perform quantization such that a parameter $QQP_{luma}(i,j)$ is calculated by adding a weighting array $W(i,j)$ to the array of the parameter $QP_{luma}$ corresponding to the respective components of the luminance signal of each block, a parameter $QQP_{chroma}(i, j)$ is calculated by adding the weighting array $W(i,j)$ to the array of the parameter $QP_{chroma}$ corresponding to the respective components of the color difference signal of each block, and weighted quantization is performed using the resultant parameter $QQP_{luma}(i,j)$ and the resultant parameter $QQP_{chroma}(i, j)$.

When the parameter $QQP_{chroma}(i, j)$ obtained via the calculation exceeds a predetermined value $QQP_{chroma\_max}$, the image signal coder may perform weighted quantization using the predetermined value $QQP_{chroma\_max}$ as the parameter $QQP_{chroma}(i, j)$.

The image information coding apparatus may perform coding such that two arrays $A(QP)$ and $B(QP)$ corresponding to the parameter QP and having the following relationship are prepared $A(QP) \times B(QP) = $Const, where Const denotes a constant, the quantization is performed in accordance with the following formula LEVEL=$(K \times A(QP)+f \times 2^m)/2^m$ dequantization corresponding to the quantization is to be performed in accordance with the following formula $K'$=LEVEL$\times B(QP)$ where K' denotes a dequantized orthogonal transform coefficient, wherein when the parameter $QQP_{chroma}(i, j)$ obtained via the calculation exceeds the predetermined value $QQP_{chroma\_max}$, a common ration is calculated in accordance with the following formula $$\frac{A(QP)}{A(QP+1)} = \frac{B(QP+1)}{B(QP)} = r$$

a variable $A(QQP_{chroma}(i, j) > QQP_{chroma\_max}$ and a variable $B(QQP_{chroma}(i, j) > QQP_{chroma\_max}$ are respectively calculated in accordance with the following formulas $$A(QQP_{chroma}(i, j) > QQP_{chroma\_max}) = \text{round}\left(\frac{A(QQP_{chroma\_max})}{r^{QQP_{chroma}(i,j)-QQP_{chroma\_max}}}\right)$$

$$B(QQP_{chroma}(i, j) > QQP_{chroma\_max}) = \text{round}(A(QQP_{chroma\_max}) \times r^{QQP_{chroma}(i,j)-QQP_{chroma\_max}})$$

where round( ) denotes a round-into-integer function, and the quantization is performed in accordance with the following formula LEVEL=$(K \times A(QQP_{chroma}(i,j) > QQP_{chroma\_max})+f \times 2^m)/2^m$.

As described above, the third image information coding and transmitting system includes an image signal coder for producing compressed image information by dividing an input image signal into blocks, performing an orthogonal transform on the blocks on a block-by-block basis, and quantizing resultant orthogonal transform coefficient and also producing header information; and a multiplex packetizer for, when the compressed image information and the header information are received from the image signal coder, multiplexing the compressed image information and the header information in accordance with a predetermined method and transmitting the resultant multiplexed information in the form of packets, wherein when the image signal coder quantizes orthogonal transform coefficients obtained via the orthogonal transform, the image signal coder performs weighted quantization on each component of the orthogonal transform coefficients by means of an addition operation on a parameter QP specifying one of elements of a series of numbers arranged in accordance with a predetermined rule in correspondence with quantization step sizes; and the multiplex packetizer multiplexes information associated with the quantization weighting together with the header information, packetizing the resultant multiplexed information separately from the compressed image information, and transmits the resultant packetized information and the compressed image information separately via different channels.

BRIEF DESCRIPTION OF THE DRAWINGS

FIG. 3 is a diagram showing a default weighting matrix applied to intra macroblocks or luminance signals, stored in a weighter of the image information coding apparatus shown in FIG. 1;

FIG. 4 is a diagram showing a default weighting matrix applied to non-intra macroblocks or color difference signals, stored in the weighter of the image information coding apparatus shown in FIG. 1;

FIG. 5 is a table indicating the number of bits necessary to represent the quantized discrete cosine coefficients, for a case in which the range of a parameter used in quantization or dequantization is extended to −8;

FIG. 6 is a diagram showing an example of a syntax for embedding information associated with extended quantization step sizes into compressed image information;

FIG. 7 is a table indicating the correspondence between parameters used in dequantization and quantizer_range included in compressed image information;

FIG. 8 is a diagram showing an example of a syntax for embedding information associated with a weighting matrix applied to DC components into compressed image information, for a case in which each component is coded with accuracy of 4 bits;

FIG. 9 is a diagram showing an example of a syntax for embedding information associated with a weighting matrix applied to DC components into compressed image information, for a case in which each component is UVLC-coded;

FIG. 10 is a diagram showing an example of a syntax for embedding, on a GOP-by-GOP basis, information associated with a weighting matrix applied to DC components into compressed image information;

FIG. 11 is a diagram showing an example of a syntax for embedding information associated with a weighting matrix into compressed image information only when the weighting matrix is to be changed, wherein each component is coded with accuracy of 4 bits;

FIG. 12 is a diagram showing an example of a syntax for embedding information associated with a weighting matrix into compressed image information only when the weighting matrix is to be changed, wherein each component is coded by means of UVLC;

FIG. 14 is a diagram showing an example of a syntax for embedding information associated with a weighting parameter applied to DC components into compressed image information, for a case in which the weighting parameter is embedded on a GOP-by-GOP basis;

FIG. 15 is a diagram showing an example of a syntax for embedding information associated with a weighting parameter applied to DC components into compressed image information, for a case in which the weighting parameter is embedded on a picture-by-picture basis;

FIG. 21 is a table showing relationships among intra_dc_precision, bit accuracy, dequantization coefficient, and predicted DC reset value, according to the MPEG2 standard;

FIG. 22 is a diagram showing default values of a quantization matrix to be applied to intra macroblocks, according to the MPEG2 standard;

FIG. 23 is a diagram showing default values of a quantization matrix to be applied to inter macroblocks, according to the MPEG2 standard;

FIG. 24 is a diagram showing a quantization matrix to be applied to non-intra macroblocks, according to MPEG2 Test Model 5; and FIG. 25 is a table showing relationships among parameters, quantiser_scale, q_scale_type (set on a picture-by-picture basis, and quantiser_scale_code (set on a macroblock-by-macroblock basis) according to the MPEG2 standard.

DESCRIPTION OF THE PREFERRED EMBODIMENTS

The present invention is described in further detail below with reference to specific embodiments in conjunction with the accompanying drawings.

First Embodiment

As a first embodiment of the present invention, an image signal coder for producing compressed image information by dividing an input image signal into blocks, performing an orthogonal transform on the blocks on a block-by-block basis, and quantizing resultant orthogonal transform coefficients, and an image signal decoder for decoding coded image information by dequantizing it and performing an inverse transform are described.

In the image information coding apparatus and the image information decoding apparatus according to the present embodiment, as will be described in detail later, weighting is performed on a parameter specifying one of elements of a sequence of numbers arranged in accordance with a predetermined rule in correspondence to quantization step sizes thereby making it possible to use greater quantization step sizes in quantizing orthogonal transform coefficients in a high frequency range in which the great quantization step sizes does not result in significant visually-perceptible degradation, than in a low frequency range in which degradation is easily perceptible, and also making it possible to prevent a spurious contour line from being created in an image including a part with gradually varying pixel values First, referring to FIG. 1, an image information coding apparatus according to the first embodiment of the present invention is described.

Figure 1:
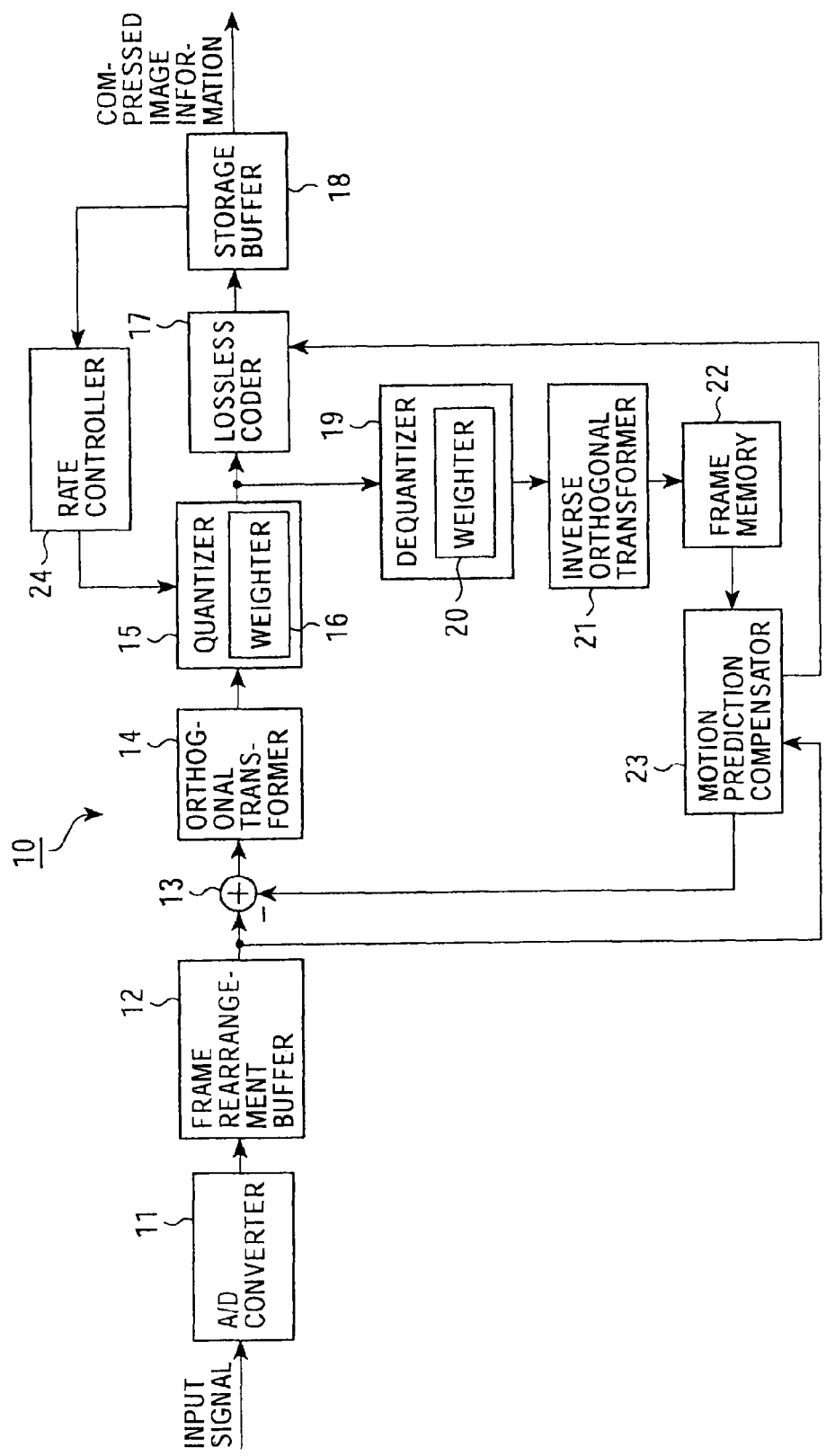
FIG. 1 is a block diagram showing an example of a construction of an image information coding apparatus according to an embodiment of the present invention.

As shown in FIG. 1, the image information coding apparatus 10 according to the first embodiment of the present invention includes an analog-to-digital converter 11, a frame rearrangement buffer 12, an adder 13, an orthogonal transformer 14, a quantizer 15, a weighter 16, a lossless coder 17, a storage buffer 18, a dequantizer 19, a weighter 20, an inverse orthogonal transformer 21, a frame memory 22, a motion prediction compensator 23, and a rate controller 24.

The operation of the image information coding apparatus 10 is described below.

In FIG. 1, the analog-to-digital converter 11 converts an input image signal into a digital signal. The frame rearrangement buffer 12 rearranges frames depending on the GOP (Group of Pictures) structure of the compressed image information output from the image information coding apparatus 10.

When the frame rearrangement buffer 12 receives a frame to be intra-coded, the frame rearrangement buffer 12 supplies the image information of the entire frame to the orthogonal transformer 14. The orthogonal transformer 14 performs an orthogonal transform such as a discrete cosine transform or a Karhunen-Loeve transform on the image information and supplies resultant transform coefficients to the quantizer 15.

The quantizer 15 quantizes the transform coefficients received from the orthogonal transformer 14. In this process, as will be described later, the weighter 16 of the quantizer 15 performs weighting on a parameter specifying one of elements of a sequence of numbers arranged in accordance with a predetermined rule in correspondence to quantization step sizes, for each component of the transform coefficients.

The lossless coder 17 performs lossless coding by means of variable length coding or arithmetic coding on the quantized transform coefficients and supplies the resultant coded transform coefficients to the storage buffer 18. The storage buffer 18 stores the received coded transform coefficients. The coded transform coefficients are output as compressed image information from the storage buffer 18.

The behavior of the quantizer 15 is controlled by the rate controller 24. The quantizer 15 also supplies the quantized transform coefficients to the dequantizer 19. The dequantizer 19 dequantizes the received transform coefficients. In this process, as will be described later, the weighter 20 of the dequantizer 19 performs weighting on a parameter specifying one of elements of a sequence of numbers arranged in accordance with a predetermined rule in correspondence to quantization step sizes, for each component of the quantized transform coefficients.

The inverse orthogonal transformer 21 performs an inverse orthogonal transform on the dequantized transform coefficients thereby producing decoded image information and stores the resultant decoded image information into the frame memory 22.

On the other hand, image information of those frames to be interframe-coded is supplied from the frame rearrangement buffer 12 to the motion prediction compensator 23. At the same time, the motion prediction compensator 23 reads image information to be referred to from the frame memory 22 and performs motion prediction compensation to produce reference image information.

The motion prediction compensator 23 supplies the reference image information to the adder 13. The adder 13 produces a difference signal indicating the difference between the image information and the reference image information. At the same time, the motion prediction compensator 23 also supplies the motion vector information to the lossless coder 17.

The lossless coder 17 performs lossless coding by means of variable length coding or arithmetic coding on the motion vector information thereby producing information to be put in a header of the compressed image information. The other processes are performed in a similar manner to compressed image information to be intra-coded, and thus they are not described herein in further detail.

Figure 2:
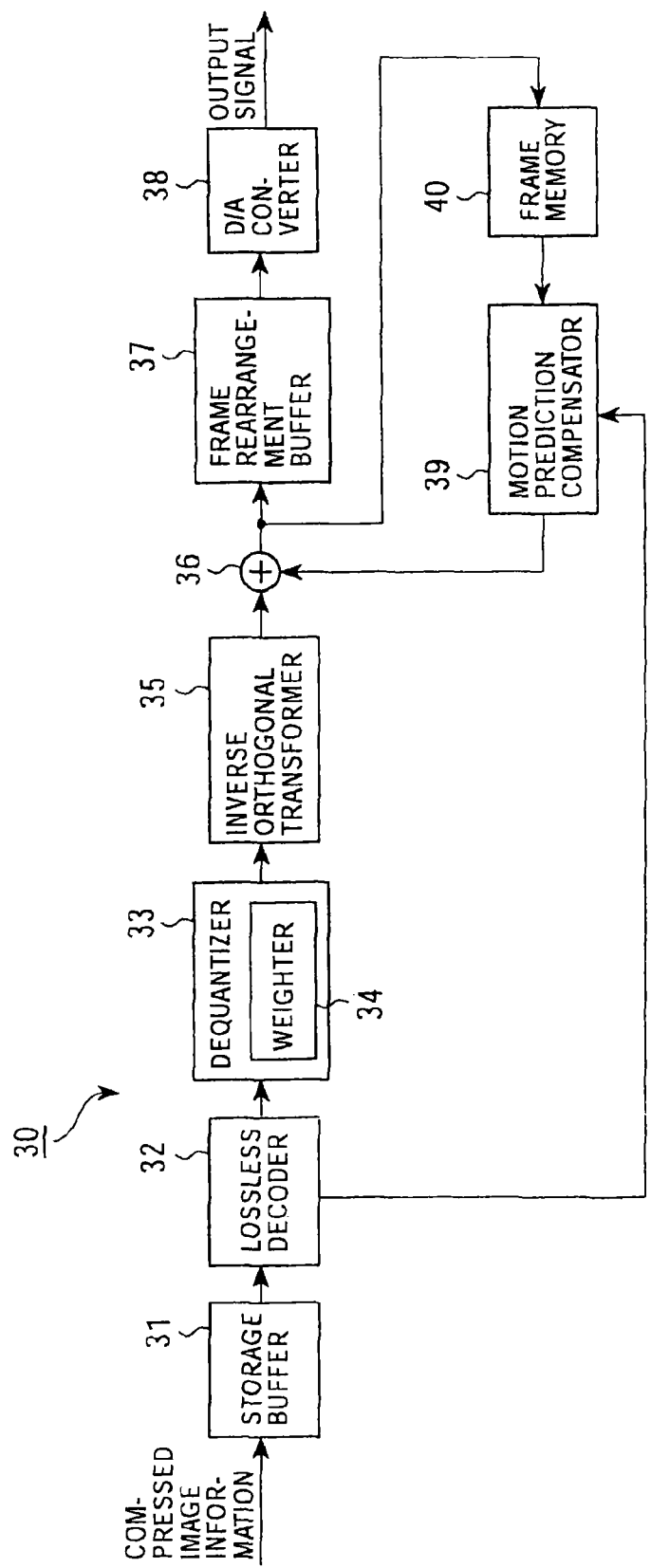
FIG. 2 is a block diagram showing an example of a construction of an image information decoding apparatus according to an embodiment of the present invention.

Now, referring to FIG. 2, an image information decoding apparatus according to the first embodiment of the present invention is described.

As shown in FIG. 2, the image information decoding apparatus 30 according to the first embodiment of the present invention includes a storage buffer 31, a lossless decoder 32, a dequantizer 33, a weighter 34, an inverse orthogonal transformer 35, an adder 36, a frame rearrangement buffer 37, a digital-to-analog converter 38, a motion prediction compensator 39, and frame memory 40.

The operation of the image information decoding apparatus 30 is described below.

In FIG. 2, compressed image information input to the storage buffer 31 is transferred to the lossless decoder 32 after being temporarily stored in the storage buffer 31. The lossless decoder 32 decodes the received compressed image information by means of variable length decoding or arithmetic decoding in accordance with the format of the compressed image information and supplies the resultant quantized transform coefficients to the dequantizer 33. In a case in which the frame being processed is an interframe-coded frame, the lossless decoder 32 also decodes the motion vector information described in the header of the compressed image information and supplies the resultant decoded information to the motion prediction compensator 39.

The dequantizer 33 dequantizes the quantized transform coefficients supplied from the lossless decoder 32 and supplies the resultant transform coefficients to the inverse orthogonal transformer 35. In this process, as will be described later, the weighter 34 of the dequantizer 33 performs weighting on a parameter specifying one of elements of a sequence of numbers arranged in accordance with a predetermined rule in correspondence to quantization step sizes, for each component of the quantized transform coefficients. The inverse orthogonal transformer 35 performs an inverse orthogonal transform such as an inverse discrete cosine transform or an inverse Karhunen-Loeve transform on the transform coefficients in accordance with the predetermined format of the compressed image information.

In a case in which the frame being processed is an intraframe-coded frame, the inverse orthogonal transformer 35 supplies the resultant image information to the frame rearrangement buffer 37. The frame rearrangement buffer 37 temporarily stores the received image information and supplies it the digital-to-analog converter 38 after the temporary storage. The digital-to-analog converter 38 converts the received image information into analog form and outputs the resultant image information in the analog form.

On the other hand, in a case in which the frame being processed is an interframe-coded frame, the motion prediction compensator 39 produces an reference image on the basis of the motion vector information subjected to the lossless decoding process and the image information stored in the frame memory 40. The adder 36 adds the received reference image to the output of the inverse orthogonal transformer 35. The other processes are performed in a similar manner to the intra-coded frame, and thus they are not described herein in further detail.

The details of the weighter 16 and the weighter 20 of the image information coding apparatus 10 (FIG. 1) and the weighter 34 of the image information decoding apparatus 30 (FIG. 2) are described below.

As described above, when the quantizer 15 (FIG. 1), the dequantizer 19 (FIG. 1), and the dequantizer 33 (FIG. 2) perform quantization or dequantization, the weighter 16, the weighter 20, and the weighter 34 disposed in the respective quantizer or dequantizers perform weighting on the parameter specifying one of elements of the sequence of numbers arranged in the predetermined rule in correspondence with the quantization step sizes.

The weighting described above makes it possible to use greater quantization step sizes in quantizing orthogonal transform coefficients in the high frequency range in which the great quantization step sizes does not result in significant visually-perceptible degradation, than in the low frequency range in which degradation is easily perceptible.

The weighting process is described in further detail below. Because the weighter 16, the weighter 20, and the weighter 34 operate in a similar manner, the operation is described herein only for the weighter 16.

The weighter 16 has information indicating default values of an array $W_{intra}(i, j)$ (i, j)=0, 1, 2, 3) to be applied to intra macroblocks. A specific example of a set of default values is shown in FIG. 3.

Similarly, the weighter 16 has information indicating default values of an array $W_{inter}(i, j)$ (i, j=0, 1, 2, 3) to be applied to inter macroblocks. A specific example of a set of default values is shown in FIG. 4.

The values shown in FIG. 3 may be employed as default values of an array $W_{luma}(i, j)$ (i, j=0, 1, 2, 3) to be applied to a luminance signal, and the values shown in FIG. 4 may be employed as default values of an array $W_{chroma}(i, j)$ (i, j=0, 1, 2, 3) to be applied to a color difference signal.

Because processes associated with the arrays $W_{intra}(i, j)$ $W_{inter}(i, j)$, $W_{luma}(i, j)$ and $W_{chroma}(i, j)$ are similar to each other, those arrays will be referred to simply as W(i, j) unless distinction is necessary.

Note that the values of the arrays $W_{intra}(i, j)$, $W_{inter}(i, j)$, the arrays $W_{luma}(i, j)$, and $W_{chroma}(i, j)$ are not limited to default values shown in FIG. 3 or FIG. 4, but a user may set the values on a picture-by-picture basis. When the values of W(i, j) are set on the picture-by-picture basis, the values may be directly embedded in compressed image information, or the original values may be converted into a compressed form by means of conversion into difference values or by means of lossless coding such as variable length coding or arithmetic coding and resultant compressed data may be embedded.

In the weighter 16, a parameter QQP(i, j) is defined, according to equation (10), for each component of 4×4 discrete cosine coefficients on the basis of the parameter QP used in macroblock-by-macroblock quantization, stored in compressed image information.

$$QQP(i,j)=QP+W(i,j) \quad (10)$$

In the present embodiment, quantization/dequantization is performed on each component in a similar manner as defined in the H.26L standard described earlier. However, arrays A(QP) and B(QP) employed in the H.26L standard are replaced with A(QQP(i, j)) and B(QQP(i, j)), respectively.

The dynamic range of QP is 0 to 31. However, there is a possibility that the value of QQP(i, j) in equation (10) exceeds 31. In such a case, the process is performed according to one of methods described below.

In a first method, when the value of QQP(i, j) exceeds 31, the value is replaced by 31 such that QQP(i, j)=31. In the second method, the QQP(i, j) is allowed to have a value greater than 31, and values of A(QQP(i, j)) and B(QQP(i, j)) are defined in accordance with equations (11) and (12), respectively.

$$A(QQP(i,j) > 31) = \text{round}\left(\frac{17}{1.12^{QQP(i,j)-31}}\right) \quad (11)$$

$$B(QQP(i,j) > 31) = \text{round}(141533 \times 1.12^{QQP(i,j)-31}) \quad (12)$$

In equations (11) and (12), round( ) denotes a round-into-integer function.

A(QQP(i, j)) and B(QQP(i, j)) determined in the above-described manner satisfy a relationship represented by equation (13) corresponding to equation (7).

$$A(QQP(i,j)) \times B(QQP(i,j)) \times 676^2 = 2^{40} \quad (13)$$

In quantization/dequantization, use of A(QQP(i, j)) and B(QQP(i, j)) for QQP(i, j)>31 makes it possible to achieve high-efficient compression at low bit rates.

In the quantization/dequantization of the luminance signal, the dynamic range may be expanded according to the second method described above, while clipping according to the first method may be employed for the color difference signal.

For QQP(i, j)<0, A(QQP(i, j)) and B(QQP(i, j)) are calculated according to equations (14) and (15), respectively, quantization/dequantization is performed in a similar manner as is defined in the H.26L standard using A(QQP(i, j)) or B(QQP(i, j)).

$$A(QQP(i,j) < 0) = \text{round}(620 \times 1.12^{-QQP(i,j)}) \quad (14)$$

$$B(QQP(i,j) < 0) = \text{round}\left(\frac{3881}{1.12^{-QQP(i,j)}}\right) \quad (15)$$

Use of A(QQP(i, j)) and B(QQP(i, j)) determined in the above-described manner makes it possible to prevent degradation in image quality due to creation of a spurious contour line in an image including a part whose pixel value varies gradually.

In the image information coding in accordance with H.26L, creation of such a spurious contour line results from insufficient accuracy of (0, 0), (0, 1) and (1, 0)-components of 4×4 discrete cosine transform coefficients.

In the present embodiment, the above problem is avoided by employing a weighting matrix given by equation (16) as W(i, j).

$$\begin{bmatrix} -8 & -6 & 0 & 0 \\ -6 & 0 & 0 & 0 \\ 0 & 0 & 0 & 0 \\ 0 & 0 & 0 & 0 \end{bmatrix} \quad (16)$$

The expansion of the dynamic range of A(QQP(i, j)) and B(QQP(i, j)) using equations (14) and (15) may be performed only for inter macroblocks or only for luminance signal components.

The expansion according to equations (14) and (15) can cause indices QQP(i, j) of A( ) and B( ) to become negative, which is undesirable in syntax of compressed image information.

The above problem can be avoided by employing new indices QQP'(i, j) given by equation (17) in quantization/dequantization, wherein $QQP_{min}$ (<0) denotes a minimum value of QQP(i, j).

$$QQP'(i,j)=QQP(i,j)-QQP_{min} \quad (17)$$

For example, if expansion according to equations (11), (12), (14), and (15) is performed so as to make it possible for QQP(i, j) to take a value in the range from −3 to 34, QQP'(i, j) given by equation (17) can take a value in the range from 0 to 37.

For a simple profile according to H.26L, a value in the range from 3 to 34 may be employed while value in the range from 0 to 34 may be employed for a complicated profile such as a 10-bit image.

An example of a manner of expanding the dynamic range of A(QQP(i, j)) and B(QQP(i, j)) according to equations (11), (12), (14), and (15) is described below.

Degradation in image quality due to creation of a spurious contour line in an image including a part having gradually varying pixel values can be avoided if quantization accuracy as measured by a corresponding quantization scale used in nonlinear quantization according to the MPEG2 standard is close to 1.

To meet the above requirement, the dynamic range of A(QQP(i, j)) and B(QQP(i, j)) may be expanded in the negative direction according to equations (14) and (15) as shown below.

A(QQP=−8 to 0): 1535, 1370, 1224, 1093, 976, 871, 777, 694, 620

B(QQP=−8 to 0): 1567, 1756, 1966, 2201, 2465, 2762, 3097, 3467, 3881

MPEG2-based quantization step sizes corresponding to the combination of extended A(QQP(i, j)) and B(QQP(i, j)) are 1.0105, 1.1322, 1.2673, 1.4192, 1.589, 1.7801, 1.9963, 1.235, and 2.5019.

Thus, accuracy as high as about 1 in quantization scale is obtained, and thus it becomes possible to prevent degradation in image quality due to creation of a spurious contour line in an image including a part with gradually varying pixel values.

Herein, a measure, R(QQP(i, j)), indicating the operation accuracy of the above combination is introduced as shown in equation (18).

$$R(QQP(i,j))=A(QQP(i,j))\cdot B(QQP(i,j))\cdot 676^2/2^{40} \quad (18)$$

The closer to 1.0 the value of R(QQP(i, j)), the smaller the operation error. For the above-described combination of A(QQP(i, j)) and B(QQP(i, j)), R(QQP(i, j)) has values of 0.9997, 0.9999, 1.0001, 0.9998, 0.9999, 1.0012, 1.0000, and 1.0001 for QQP(i, i) of −8 to 0, respectively, and thus the accuracy is high enough.

The dynamic ranges of A(QQP(i, j)) and B(QQP(i,j)) may be extended to the positive direction on the basis of equations (11) and (12), as shown below.

$$A(QQP=31,\ldots,35): 17,15,13,12,11$$

$$B(QQP=31,\ldots,35): 141533,160404,185082,200505,218733$$

MPEG2-based quantization step sizes corresponding to the combination of A(QQP(i, j)) and B(QQP(i, j)) extended in the above-described manner will be 91.2440, 103.4099, 119.3191, 129.2623, and 141.0135, and thus high-efficiency compression can be achieved at low bit rates.

If R(QQP(i, j)) is calculated for the above combination of A(QQP(i, j)) and B(QQP(i, j),) the resultant values of R are 1.0000, 1.0000, 1.0000, 1.0000, and 1.0000 for QQP(i, j) of 31 to 35, respectively, and thus the accuracy is high enough.

When the dynamic ranges of A(QQP(i,j)) and B(QQP(i,j)) are expanded using the above-descried technique, the bit length of associated data becomes as follows.

For example, when QQP(i, j)=0, if an input pixel value or a difference value thereof has accuracy of 9, the maximum value of the quantized orthogonal transform coefficients, LEVEL, is given as 408 ($=255 \times 52^2 \times 620/2^{20}$, and thus 10 bits are necessary to represent LEVEL.

FIG. 5 shows the number of bits necessary to represent the quantized orthogonal transform coefficient LEVEL for QQP of −1 to −8.

FIG. 6 shows an example of a syntax for embedding information associated with the extended quantization step sizes into compressed image information.

As can be seen from FIG. 7, quantizer_range shown in FIG. 6 is a flag indicating which range of values of QQP(i, j) extended according to equations (11), (12), (14), and (15) should be used in compressed image information. When this flag has a value of 0, quantization/dequantization is performed in the same manner as defined in the current H.26L standard.

In the image information coding apparatus and the image information decoding apparatus according to the present invention, a default weighting matrix to applied to the luminance signal is defined by equation (19), and that applied to the color difference signals is defined by equation (20).

$$W_{intra}(i,j) = \begin{pmatrix} 8 & 9 & 10 & 11 \\ 9 & 10 & 11 & 12 \\ 10 & 11 & 12 & 13 \\ 11 & 12 & 13 & 14 \end{pmatrix} \quad (19)$$

$$W_{non-intra}(i,j) = \begin{pmatrix} 8 & 8 & 8 & 8 \\ 8 & 8 & 8 & 8 \\ 8 & 8 & 8 & 8 \\ 8 & 8 & 8 & 8 \end{pmatrix} \quad (20)$$

The weighting matrices used in quantization/dequantization performed in the image information coding apparatus or the image information decoding apparatus are not limited to the default matrices described above, but weighting matrices can be set by a user for each picture.

In FIG. 6, load_intra_quantiser_matrix, load_non_intra_quantiser_matrix, load_chroma_intra_quantiser_matrix, and load_chroma_non_intra_quantiser_matrix are 1-bit flags indicating whether a weighting matrix other than the default weighting matrix should be used for the luminance and color difference signals in intra macroblocks and inter macroblocks, wherein the weighting matrix other than the default weighting matrix is used when the flag has a value of 1.

For example, if load_intra_quantiser_matrix has a value of 1, information associated with 4×4 weighting matrix whose components are each represented in 4 bits is described in following intra_quantiser_matrix[16].

The length of each component is not limited to 4 bits as in the present embodiment, but the length may be 8, 12, or another number of bits.

The information associated with intra_quantiser_matrix [16] may be compressed by means of conversion into difference values or by means of lossless coding such as variable length coding or arithmetic coding.

Although in the embodiment described above, the pixel value of input image information is represented in 8 bits, the above-described expansion may also be applied to image information whose pixel value is represented in a different number of bits, such as 10 bits.

In the image information coding apparatus 10 (FIG. 1) and the image information decoding apparatus 30 (FIG. 2) according to the present embodiment, as described above, weighted quantization/dequantization is achieved by performing weighting on the parameter specifying one of elements of the sequence of numbers arranged in accordance with the predetermined rule in correspondence to quantization step sizes, so that greater quantization step sizes are employed in quantization of orthogonal transform coefficients in the high frequency range in which the great quantization step sizes does not result in significant visually-perceptible degradation, and smaller quantization step sizes are employed in the low frequency range in which degradation is easily perceptible.

Furthermore, it also becomes possible to extend the dynamic range even in the case in which the weighting causes the parameter to go out of the predetermined range, thereby making it possible to prevent a spurious contour line from being created in an image including a part with gradually varying pixel values and also making it possible to perform high-efficient compression at low bit rates.

Modifications of the first embodiment are described below.
First Modification

In the first embodiment described above, two arrays A(QP) and B(QP) are given in the form of tables.

Alternatively, two arrays A(QP) and B(QP) may be determined in accordance with equations as described below.

For example, arrays A(QP) and B(QP) may be given by equations (21) and (22), respectively.

$$A(QP) = A_{mantissa}(QP) \cdot 2^{A_{exponent}(QP)} \quad (21)$$

$$B(QP) = B_{mantissa}(QP) \cdot 2^{B_{exponent}(QP)} \quad (22)$$

In the above equations ((21) and (22)), array A(QP) is set such that the values of elements thereof decrease by 12% with increasing of the value of QP by 1, the values of elements of array A(QP) is approximately halved each time the value of QP increases by 6. Thus, if $A_{mantissa(QP)}$ is defined for first six values of QP in equation (21), then array A(QP) can be extended such that any set of six elements are produced by multiplying a previous set of six elements by ½ as shown in equation (23).

$$\{a_1, a_2, a_3, a_4, a_5, a_6\}, \quad (23)$$
$$\left\{a_7\left(=\frac{a_1}{2}\right), a_8\left(=\frac{a_2}{2}\right), a_9\left(=\frac{a_3}{2}\right),\right.$$

-continued
$$a_{10}\left(=\frac{a_4}{2}\right), a_{11}\left(=\frac{a_5}{2}\right), a_{12}\left(=\frac{a_6}{2}\right)\}, \ldots$$

Thus, the quantized output level LEVEL(i, j) of a coefficient f(i, j) is given by equation (24).

$$\text{LEVEL}(i,j)=\text{sign}(f(i,j))((|f(i,j)|//2^{fdct\_shift} \times A_{man}[QP\%6]+qp\_\text{const})/2^{shift(QP)} \quad (24)$$

Specific examples of parameters such as fdct_shift in equation (24) are shown in equations (25) to (30).

$$fdct\_shift=7 \quad (25)$$

$$\text{Intra}:qp\_\text{const}=(1<<(20-A_{exp\ 0}+QP/6-fdct\_shift))/3 \quad (26)$$

$$\text{Inter}:qp\_\text{const}=(1<<(20-A_{exp\ 0}+QP/6-fdct\_shift))/6 \quad (27)$$

$$A_{exp\ 0}=-5 \quad (28)$$

$$\text{shift}(QP)=20-A_{exp\ 0}+QP/6-fdct\_shift \quad (29)$$

$$\text{int } A_{man}[6]=\{20050,18797,15829,14322,12532, 11139\} \quad (30)$$

Similarly, if array B(QP) is set such that the values of elements thereof increase by 12% with increasing of QP by 1, the values of elements of array B(QP) is approximately doubled each time the value of QP increases by 6. Thus, if $B_{mantissa(QP)}$ is defined for first six values of QP in equation (22), then array B(QP) can be extended such that any set of six elements are produced by multiplying a previous set of six elements by 2 as shown in equation (31).

$$\{b_1,b_2,b_3,b_4,b_5,b_6\},\{b_7(=2b_1),b_8(=2b_2),b_9(=2b_3),b_{10}(=2b_4),b_{11}(=2b_5),b_{12}(=2b_6)\}, \quad (31)$$

Thus, the dequantized output f(i, j) of the quantized output level LEVEL(i, j) is given by equation (32).

$$f(i,j)=\text{LEVEL}(i,j)\times B_{man}(QP\%6)<<(QP/6) \quad (32)$$

Specific examples of B{exp 0} and $\text{int}B_{man}$ are shown in equations (33) and (34), respectively.

$$B_{exp\ 0}=6 \quad (33)$$

$$\text{int}B_{man}[6]=\{60,64,76,84,96,108\} \quad (34)$$

In the case in which arrays A(QP) and B(QP) are given by mathematical expressions, the same effects and advantages as those described above can be achieved by calculating QQP according to QQP(i, j)=QP+W(i, j) and replacing QP in equations with QQP.

Second Modification

In H.26L (JVT Codec), 4×4-size orthogonal transform and quantization are performed on 16 DC components of a luminance signal in a macroblock to be intra-coded, and 2×2-size orthogonal transform and quantization are performed on 4 DC components of color difference signals in the macroblock to be intra-coded. The orthogonal transform is not limited to the discrete cosine transform employed in the present embodiment, but other orthogonal transforms such as an Hadamard transform may also be employed.

In the quantization of DC components of the luminance signal and the color difference signal, a weighting matrix W(i, j) different from that applied to AC components may be employed as described below.

For example, in the case in which the Hadamard transform is employed, a 4×4-size Hadamard transform is represented by equation (35).

$$\begin{pmatrix} 1 & 1 & 1 & 1 \\ 1 & 1 & -1 & -1 \\ 1 & -1 & -1 & 1 \\ 1 & 1 & 1 & -1 \end{pmatrix} \quad (35)$$

W(i, j) used in quantization after completion of the Hadamard transform is defined in a similar manner to W(i, j) described above. More specifically, W(i, j) given by equation (36) may be employed.

$$W_{luma\_dc}(i,j) = \begin{pmatrix} 0 & 1 & 2 & 3 \\ 1 & 2 & 3 & 4 \\ 2 & 3 & 4 & 5 \\ 3 & 4 & 5 & 6 \end{pmatrix} \quad (36)$$

Using W(i, j) given by equation (36), QQP(i, j) can be determined according to equation (37), and respective frequency components are quantized with the quantization step sizes corresponding to QQP(i, j).

$$QQP(i,j)=QP+W_{luma\_dc}(i,j) \quad (37)$$

On the other hand, a 2×2-size Hadamard transform is given by equation (38).

$$\begin{pmatrix} 1 & 1 \\ 1 & -1 \end{pmatrix} \quad (38)$$

W(i, j) to be used in the quantization of the coefficients having been subjected to the Hadamard transform is obtained by simply modifying W(i, j) employed in the previous embodiment into a 2×2 size. The quantization scale applied to each frequency component is given by adding the matrix component to the quantization scale QP. W(i, j) applied to DC components of the color difference signal may be given, for example, by equation (39).

$$W_{chroma\_dc}(i,j) = \begin{pmatrix} 0 & 1 \\ 1 & 2 \end{pmatrix} \quad (39)$$

Using W(i, j) given by equation (39), QQP(i, j) can be determined according to equation (40), and respective frequency components are quantized with the quantization step sizes corresponding to QQP(i, j).

$$QQP(i,j)=QP+W_{chroma\_dc}(i,j) \quad (40)$$

As described above, the weighting matrix W(i, j) different from that applied to the AC components is applied to the DC components so as to improve the accuracy of the DC components which are important to obtain high image quality, while reducing the amount of information associated with AC components to achieve high coding efficiency.

FIGS. 8 and 9 show examples of syntax for embedding information associated with the weighting matrix applied to the DC components into compressed image information.

The syntax shown in FIG. 8 includes, in addition to the syntax shown in FIG. 6, 1-bit flags load_luma_dc_matrix and load_chroma_dc_matrix necessary to embed information associated with the weighting matrix applied to the DC components into compressed image information. Those flags indicate whether W(i, j) should be changed for a present picture, GOP, or sequence. If the flags have a value of 0, the current values or default values are used for W(i, j). If the flags have a value of 1, the values of respective components of 4×4 matrix W(i, j) and 2×2 matrix W(i, j) are transmitted.

The values of respective components are not necessarily needed to be coded in 4 bits, but they may be coded by means of UVLC (Universal Variable Length Coding) employed in the H.26L standard, as shown in FIG. 9, or differences from previous component values may be coded by means of DPCM or the like.

Information associated with the weighting matrix W(i, j) may be transmitted on a GOP-by-GOP basis. In this case, syntax shown in FIG. 10 may be employed.

Instead of using 1-bit flags such as load_xxx_matrix, W(i, j) is directly transmitted when a change is needed, as shown in FIG. 11. In this case, the respective components may be coded by means of UVLC as shown in FIG. 12.

Figure 13:
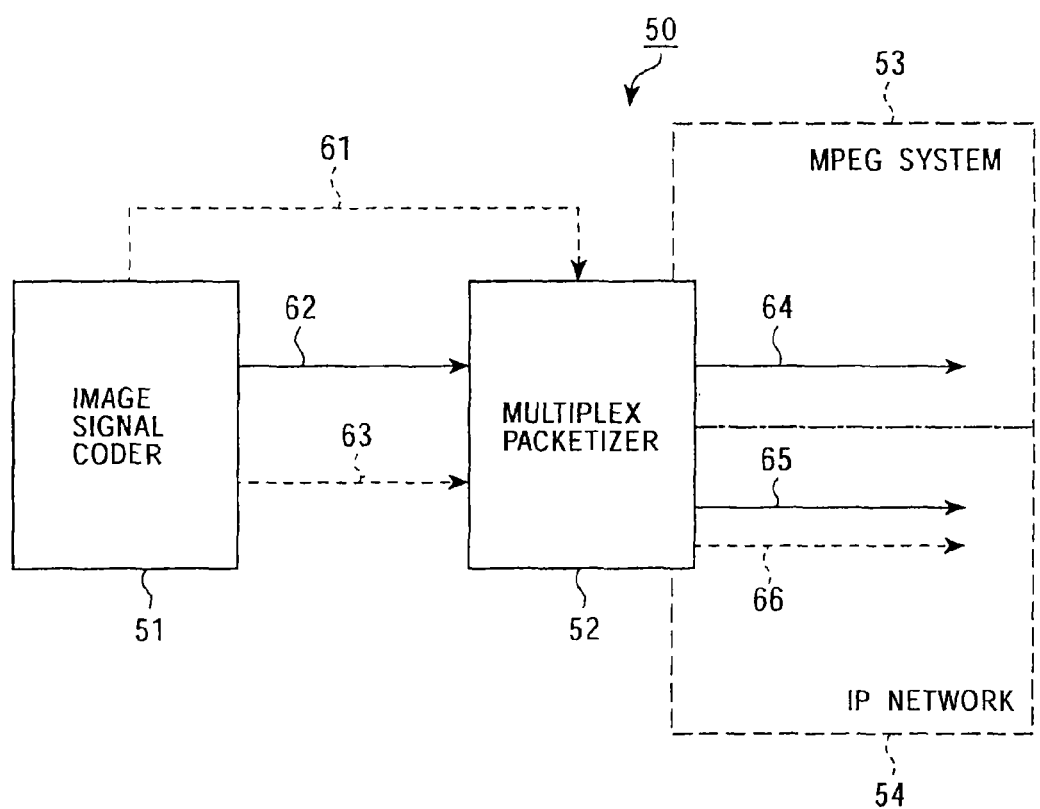
FIG. 13 is a block diagram showing an example of a construction of an image information coding and transmitting system according the present invention.

Referring now to FIG. 13, an image information coding and transmitting system according to the first embodiment of the present invention is described below.

In H.26L (JVT codec), an image signal coder (Video Coding Layer (VCL)) for coding an image signal and a multiplex packetizer (Network Adaption Layer (NAL)) for transmitting the coded image signal in a specified file format over a network are separately constructed in an image information coding and transmitting system. FIG. 13 shows an example of a construction of such an image information coding and transmitting system.

In the image information coding and transmitting system 50 shown in FIG. 13, an image signal coder 51 performs coding on an image signal in accordance with one of the embodiments described above. The compressed image information output from the image signal coder 51 includes separate elements corresponding to respective syntaxes.

The compressed image information (syntax elements) 62, boundary information 63 indicating the boundaries of syntax elements, and header information 61 including flags (corresponding to a sequence header, a GOP header, and a start code in the MPEG2) necessary to decode the respective syntax elements are supplied from the image signal coder 51 to the multiplex packetizer 52.

In a case in which the compressed image information 62 is transmitted in accordance with RTP (Real-time Transfer Protocol) (via an IP network 54), the multiplex packetizer 52 maps the respective syntax elements 62 onto RTP packets 65 in accordance with a predetermined method. A header necessary in decoding is also mapped.

The header may be transmitted in a different packet (a header packet 66 in the example shown in FIG. 13). Because the header includes important information necessary in decoding, the header may be transmitted via a different channel to minimize occurrence of errors.

In this case, to transmit the weighting matrix W(i, j), the multiplex packetizer 52 maps it together with the header information 61 necessary in decoding into an RPT packet 65 according to a predetermined method. For this purpose, syntax shown in FIG. 14 or 15 may be employed.

The multiplex packetizer 52 may transmit the compressed image information 62 via an MPEG system 53. In this case, the multiplex packetizer 52 multiplexes the respective syntax elements 62 of the compressed image information and the associated header information 61 necessary in decoding into an MPEG system stream 64 and transmits the resultant MPEG system stream 64. In this case, the multiplex packetizer 52 adds a start code at the beginning of each access unit and also adds a sequence header, a GOP header, and user data at the beginning of particular access units.

In this case, when the weighting matrix W(i, j) is transmitted, it is added at the beginning of each access unit together with the header information.

In MPEG, the access unit is a picture. In H.26L, in contrast, the access unit is a slice. That is, in the case of H.26L, the weighting matrix W(i, j) is added at the beginning of each slice.

After adding the above information to the compressed image information, the multiplex packetizer 52 packetizes the data of respective access units into the MPEG system stream 64 and transmits the resultant MPEG system stream 64.

The technique described above may be applied to other transmission schemes other than MPEG, such as RTP.

Third Modification

In the second modification described above, the first orthogonal transform and quantization are performed on an input image signal, and the 4×4 and 2×2 second orthogonal transform and quantization are performed on 16 DC components of the luminance signal of a macroblock to be intra-coded and 4 DC components of the color difference signal to be intra-coded. In the quantization, the weighting factors for respective frequency components are given by the weighting matrix W(i, j).

Alternatively, in the quantization performed after the first or second orthogonal transform, the respective frequency components may be equally weighted, as described below.

That is, the quantization after the first orthogonal transform is performed using the quantization scale QP included in the compressed image information to be transmitted, in accordance with, for example, equation (8).

On the other hand, in the quantization after the second orthogonal transform, the QP in equation (8) is replaced with QQP calculated according to equation (41).

$$QQP = QP + X \tag{41}$$

In equation (41), a parameter X is an integer, and thus the respective frequency components are equally weighted. The weighting on QP is performed by the weighter 16 in the image information coding apparatus 10 (FIG. 2) described earlier.

Similarly, the dequantization is performed by the weighter 34 of the image information decoding apparatus (FIG. 3) using QP or QQP in accordance with equation (9).

The parameter X may be transmitted together with the compressed image information from the coding apparatus to the decoding apparatus, which may extract the parameter X from the received compressed image information and may use it in the second dequantization.

For example, when the parameter X used in the second quantization is transmitted on the GOP-by-GOP or picture-by-picture basis, the syntax shown in FIG. 14 or FIG. 15 may be employed. In FIGS. 14 and 15, the parameter X is represented by DC_quant_weight.

Although flags have a fixed length of 4 bits in the examples shown in FIGS. 14 and 15, the length may be set arbitrarily. The flags may be coded by means of UVLC and the coded flags may be transmitted.

The multiplex packetizer 52 shown in FIG. 13 may multiplex and transmit the parameter X separately from the compressed image information generated by the image signal coder 51.

As described above in detail, in the image information coding method/apparatus according to the first embodiment of the present invention, an input image signal is divided into blocks, an orthogonal transform is performed on the blocks on a block-by-block basis, and resultant orthogonal transform coefficients are quantized, wherein, in the quantization, weighting is performed for each component of the orthogonal transform coefficients by means of an addition operation on a parameter QP specifying one of elements of a series of numbers arranged in accordance with a predetermined rule in correspondence with quantization step sizes.

In this image information coding method/apparatus, an array A(QP) consisting of elements having values which increase or decrease by α% with increasing of the value of the parameter QP by 1 is used as the sequence of numbers corresponding to the quantization step sizes, and the quantization is performed such that the orthogonal transform coefficients K are multiplied by the values of the array A(QP) and the resultant product is quantized.

Furthermore, in this image information coding method/apparatus, when the parameter QP exceeds an upper limit or a lower limit, the array A(QP) is extended so as to have an extended value or values determined on the basis of the increasing or decreasing ratio of the original array A(QP), and the extended value or values of the A(QP) are used for the exceeding value or values of the parameter QP.

That is, in this image information coding method/apparatus, the quantization is performed such that the orthogonal transform coefficient is first multiplied by the value of the array A(QP) and then the resultant product is quantized, wherein QP is a parameter specifying one of elements of a series of numbers arranged in accordance with a predetermined rule in correspondence with quantization step sizes and the value of the array A(QP) increases or decreases by α% with increasing of the value of the parameter QP by 1.

When the parameter QP exceeds an upper limit or a lower limit, the array A(QP) may be extended so as to have an extended value or values determined on the basis of the increasing or decreasing ratio of the original array A(QP), and the extended value or values of the A(QP) may be used for the exceeding value or values of the parameter QP.

Thus, it becomes possible to use greater quantization step sizes in quantizing orthogonal transform coefficients in the high frequency range in which the great quantization step sizes does not result in significant visually-perceptible degradation, than in the low frequency range in which degradation is easily perceptible.

Furthermore, it becomes possible to prevent a spurious contour line from being created in an image including a part with gradually varying pixel values and it also becomes possible to perform high-efficient compression at low bit rates.

In the image information coding method/apparatus according to the first embodiment of the invention, an input image information may be coded by dividing the input image signal into first blocks, performing a first orthogonal transform on the first blocks on a block-by-block basis, forming second blocks including only DC components of orthogonal transform coefficients obtained via the first orthogonal transform, and performing a second orthogonal transform on the second blocks; and quantizing the coefficients of AC components obtained via the first orthogonal transform and quantizing the coefficients of the DC component obtained via the second orthogonal transform, wherein, in the quantization, coefficients of the AC components obtained via the first orthogonal transform may be weighted differently from the coefficients of the DC components obtained via the second orthogonal transform.

That is, in this image information coding method/apparatus, coefficients of DC components obtained via the first orthogonal transform are extracted, and the second orthogonal transform is performed on the extracted coefficients, and the coefficients of AC components obtained via the first orthogonal transform and the coefficients of DC components obtained via the second orthogonal transform are quantized in weighted fashion such that the coefficients of AC components are weighted differently from the coefficients of DC components.

This allows improvement in accuracy of the DC components which are important to obtain high image quality, while allowing reduction in the amount of information associated with AC components, thereby achieving high coding efficiency.

In the image information decoding method/apparatus according to the first embodiment, when compressed image information is given which has been coded via a process including the steps of dividing an input image signal into blocks, performing an orthogonal transform on the blocks on a block-by-block basis, and quantizing resultant orthogonal transform coefficients, the given image information is decoded by performing dequantization and an inverse orthogonal transform, wherein, in the dequantization, weighted dequantization is performed on each component of the quantized coefficients by means of an addition operation on a parameter QP specifying one of elements of a series of numbers arranged in accordance with a predetermined rule in correspondence with quantization step sizes.

In this image information decoding method/apparatus, an array B(QP) consisting of elements having values which increase or decrease by β% with increasing of the value of the parameter QP by 1 is used as the sequence of numbers corresponding to the quantization step sizes, and the dequantization is performed by multiplying the quantized coefficients by the values of the array B(QP).

In this image information decoding method/apparatus, when the parameter QP exceeds an upper limit or a lower limit, the array B(QP) is extended so as to have an extended value or values determined on the basis of the increasing or decreasing ratio of the original array B(QP), and the extended value or values of the B(QP) are used for the exceeding value or values of the parameter QP.

That is, in this image information decoding method/apparatus, the dequantization is performed such that the quantized coefficient is multiplied by the value of the array B(QP), wherein QP is a parameter specifying one of elements of a series of numbers arranged in accordance with a predetermined rule in correspondence with quantization step sizes, and the value of the array B(QP) increases or decreases by β% with increasing of the value of the parameter QP by 1.

When the parameter QP exceeds an upper limit or a lower limit, the array B(QP) is extended so as to have an extended value or values determined on the basis of the increasing or decreasing ratio of the original array B(QP), and the extended value or values of the B(QP) are used for the exceeding value or values of the parameter QP.

Thus, in decoding of compressed image information, it becomes possible to use greater quantization step sizes in dequantizing orthogonal transform coefficients in the high frequency range in which the great quantization step sizes does not result in significant visually-perceptible degradation, than in the low frequency range in which degradation is easily perceptible.

In the image information decoding method/apparatus according to the first embodiment of the present invention, when image information is given which has been coded via a process including the steps of for decoding an input image signal which has been decoded via a process including the steps of dividing an input image signal into first blocks, performing a first orthogonal transform on the first blocks on a block-by-block basis, forming second blocks including only DC components of orthogonal transform coefficients obtained via the first orthogonal transform, and performing a second orthogonal transform on the second blocks; and quantizing the coefficients of AC components obtained via the first orthogonal transform and the coefficients of DC components obtained via the second orthogonal transform such that the coefficients of the AC components obtained via the first orthogonal transform were weighted differently from the coefficients of the DC components obtained via the second orthogonal transform, the given image information is decoded via a process including the steps of dequantizing the quantized coefficients of AC components and the coefficients of DC components quantized after completion of the second orthogonal transform such that the quantized coefficients of AC components and the coefficients of DC components are weighted differently by amounts corresponding to the weights employed in the quantization.

That is, in this image information decoding method/apparatus, when compressed image information is given which has been quantized such that coefficients of DC components obtained via the first orthogonal transform were extracted, and the second orthogonal transform was performed on the extracted coefficients, and the coefficients of AC components obtained via the first orthogonal transform and the coefficients of DC components obtained via the second orthogonal transform were quantized in weighted fashion such that the coefficients of AC components were weighted differently from the coefficients of DC components, the dequantization of the given image information is performed such that the quantized coefficients of AC components and the coefficients of DC components quantized after being subjected to the second orthogonal transform are respectively dequantized with different weights corresponding to the weights employed in the quantization.

This allows improvement in accuracy of the DC components which are important to obtain high image quality, while allowing reduction in the amount of information associated with AC components, thereby achieving high coding efficiency.

In the image information coding and decoding method according to the first embodiment of the present invention, an input image signal is coded by dividing the input image signal into blocks, performing an orthogonal transform on the blocks on a block-by-block basis, and quantizing resultant orthogonal transform coefficients, and the resultant compressed image signal is decoded, wherein the quantization process includes the steps of:

preparing two arrays A(QP) and B(QP) which satisfy the following relationship for a parameter (0 {<=} QP n−1, where n is an integer) specifying one of elements of a series of numbers arranged in accordance with a predetermined rule in correspondence with quantization step sizes $$A(QP) \times B(QP) = \text{Const, where Const denotes a constant,}$$

and performing quantization in accordance with the following formula $$\text{LEVEL} = (K \times A(QP) + f \times 2^m)/2^m$$

where K denotes an unquantized orthogonal transform coefficient, m denotes a predetermined integer, f denotes a rounding constant, LEVEL denotes a quantized output, the dequantization is performed in accordance with the following formula $$K' = \text{LEVEL} \times B(QP)$$

where K' denotes a dequantized orthogonal transform coefficient, wherein normalization in the orthogonal transform is performed at the same time for the quantization and the dequantization, and wherein weighted quantization and weighted dequantization are performed such that a parameter QQP(i, j) is calculated for each component of the orthogonal transform coefficients, using an array W(i, j) prepared in advance, according to the formula QQP(i, j)=QP+W(i, j), and weighted quantization and weighted dequantization are performed using two variables A(QQP(i, j)) and B(QQP(i, j)), respectively, which are given by the parameter QQP(i, j) for each component.

In this image information coding and decoding method, when quantization and dequantization are performed on the basis of the arrays A(QP) and B(QP), the parameter QQP(i, j) is calculated for each component of the orthogonal transform coefficients using the prepared array W(i, j) according to the formula QQP(i, j)=QP+W(i, j), and weighted quantization and weighted dequantization are performed using two variables A(QQP(i, j)) and B(QQP(i, j)), respectively, which are given by the parameter QQP(i, j) for each component.

If the value of QQP(i, j) exceeds a predetermined domain, arrays A(QQP) and B(QQP) obtained by extending the dynamic ranges of the arrays A(QP) and B(QP) are used.

Thus, it becomes possible to use greater quantization step sizes in quantizing orthogonal transform coefficients in the high frequency range in which the great quantization step sizes does not result in significant visually-perceptible degradation, than in the low frequency range in which degradation is easily perceptible.

Furthermore, it becomes possible to prevent a spurious contour line from being created in an image including a part with gradually varying pixel values and it also becomes possible to perform high-efficient compression at low bit rates.

The image information coding and transmitting system according to the first embodiment of the present invention includes an image signal coder for producing compressed image information by dividing an input image signal into blocks, performing an orthogonal transform on the blocks on a block-by-block basis, and quantizing resultant orthogonal transform coefficient and also producing header information; and a multiplex packetizer for, when the compressed image information and the header information are received from the image signal coder, multiplexing the compressed image information and the header information in accordance with a predetermined method and transmitting the resultant multiplexed information in the form of packets, wherein when the image signal coder quantizes orthogonal transform coefficients obtained via the orthogonal transform, the image signal coder performs weighted quantization on each component of the orthogonal transform coefficients by means of an addition operation on a parameter QP specifying one of elements of a series of numbers arranged in accordance with a predetermined rule in correspondence with quantization step sizes; and the multiplex packetizer multiplexes information associated with the quantization weighting together with the header information and packetizes the multiplexed information.

The image information coding and transmitting system according to the first embodiment of the present invention may include an image signal coder for producing compressed image information by dividing an input image signal into blocks, performing an orthogonal transform on the blocks on a block-by-block basis, and quantizing resultant orthogonal transform coefficient and also producing header information; and a multiplex packetizer for, when the compressed image information and the header information are received from the image signal coder, multiplexing the compressed image information and the header information in accordance with a predetermined method and transmitting the resultant multiplexed information in the form of packets, wherein the multiplex packetizer adds at least the header information to each access unit, at the beginning thereof, of the compressed image information.

The image information coding and transmitting system according to the first embodiment of the present invention may include an image signal coder for producing compressed image information by dividing an input image signal into blocks, performing an orthogonal transform on the blocks on a block-by-block basis, and quantizing resultant orthogonal transform coefficient and also producing header information; and a multiplex packetizer for, when the compressed image information and the header information are received from the image signal coder, multiplexing the compressed image information and the header information in accordance with a predetermined method and transmitting the resultant multiplexed information in the form of packets, wherein when the image signal coder quantizes orthogonal transform coefficients obtained via the orthogonal transform, the image signal coder performs weighted quantization on each component of the orthogonal transform coefficients by means of an addition operation on a parameter QP specifying one of elements of a series of numbers arranged in accordance with a predetermined rule in correspondence with quantization step sizes; and the multiplex packetizer multiplexes information associated with the quantization weighting together with the header information, packetizing the resultant multiplexed information separately from the compressed image information, and transmits the resultant packetized information and the compressed image information separately via different channels.

Second Embodiment

In the first embodiment described above, quantization and dequantization are performed using the quantization parameter $QP_{luma}$ as the quantization parameter Q for the luminance signal.

However, when the quantization parameter $QP_{luma}$ is increased by 1, the quantization parameter $QP_{chroma}$ applied to the color difference signal does not necessarily increase by 1. Thus, in the image information coding apparatus (for example, the image information coding apparatus 10 shown in FIG. 1) and in the image information decoding apparatus (for example, the image information decoding apparatus 30 shown in FIG. 2) according to the first embodiment, simple weighting on the luminance signal according to equation (10) does not necessarily cause the color difference signal to be properly weighted.

The image information coding apparatus and the image information decoding apparatus according to the second embodiment described herein are based on the first embodiment, but improvements are made so as to solve the above-described problem. That is, in the image information coding apparatus and the image information decoding apparatus according to the second embodiment, weighting on the color difference signal is possible even in the case in which the quantization parameter $QP_{luma}$ applied to the luminance signal and the quantization parameter $QP_{chroma}$ applied to the color difference signal can have different values as with the process according to the H.26L standard, and those values are represented by a single parameter QP described in compressed image information.

Figure 16:
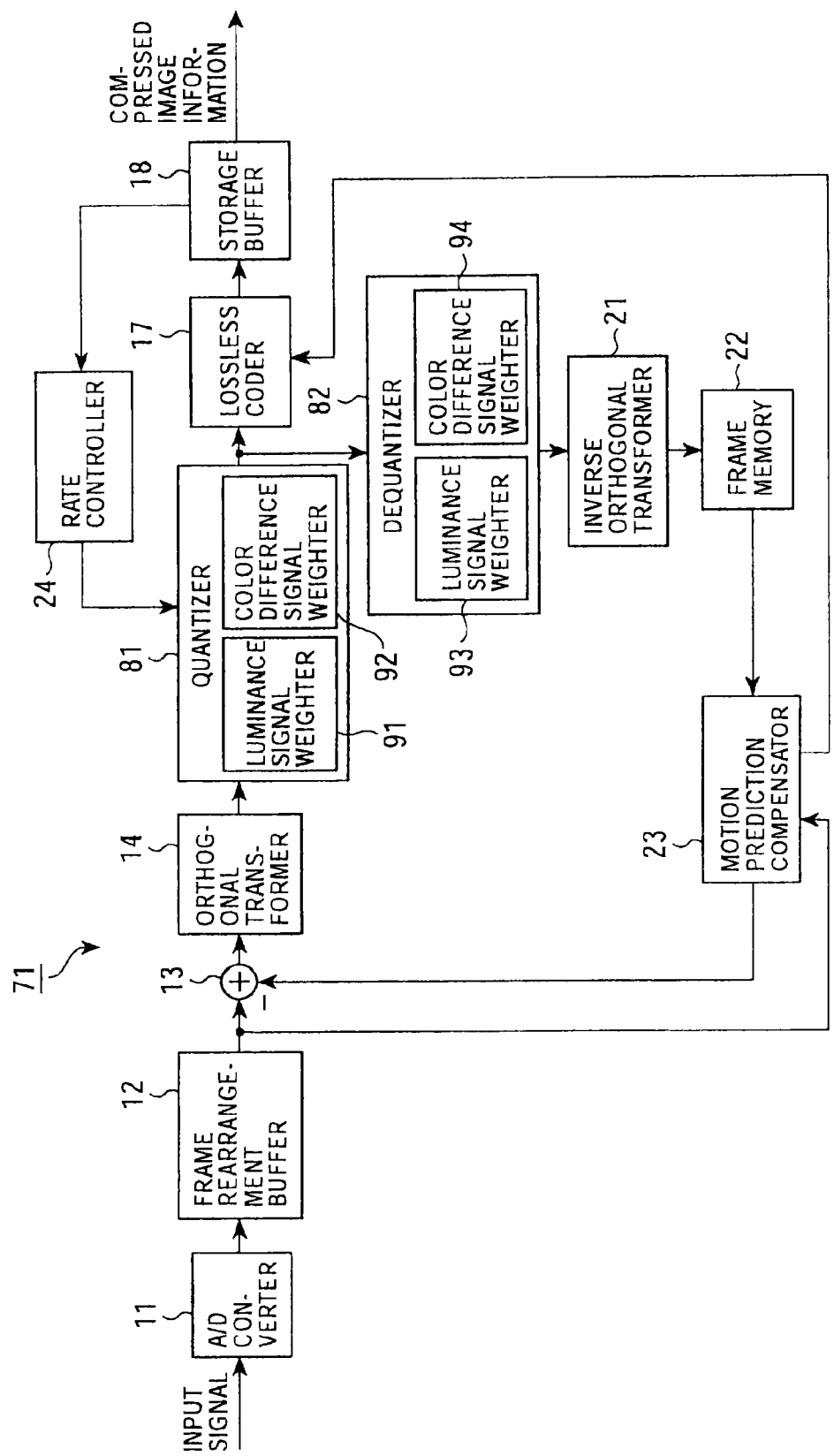
FIG. 16 is a block diagram showing another example of a construction of an image information coding apparatus according to the present invention.

FIG. 16 shows an example of a construction of an image information coding apparatus 71 according to the second embodiment of the present invention, in which similar parts to those of the image information coding apparatus 10 shown in FIG. 1 are denoted by similar reference numerals.

In this construction, the quantizer 15 shown in FIG. 1 is replaced with a quantizer 81, and the dequantizer 19 shown in FIG. 1 is replaced with an dequantizer 82.

The other parts are similar to those of the image information coding apparatus 10 shown in FIG. 1.

In contrast to the quantizer 15 having a single weighter 16 shown in FIG. 1, the quantizer 81 includes two weighters, that is, a luminance signal weighter 91 for performing weighting on the luminance signal and a color difference signal weighter 92 for performing weighting on the color difference signal.

Similarly, in contrast to the dequantizer having a single weighter 20 shown in FIG. 1, the dequantizer 82 includes two weighters, that is, a luminance signal weighter 93 for performing weighting on the luminance signal and a color difference signal weighter 94 for performing weighting on the color difference signal.

Figure 17:
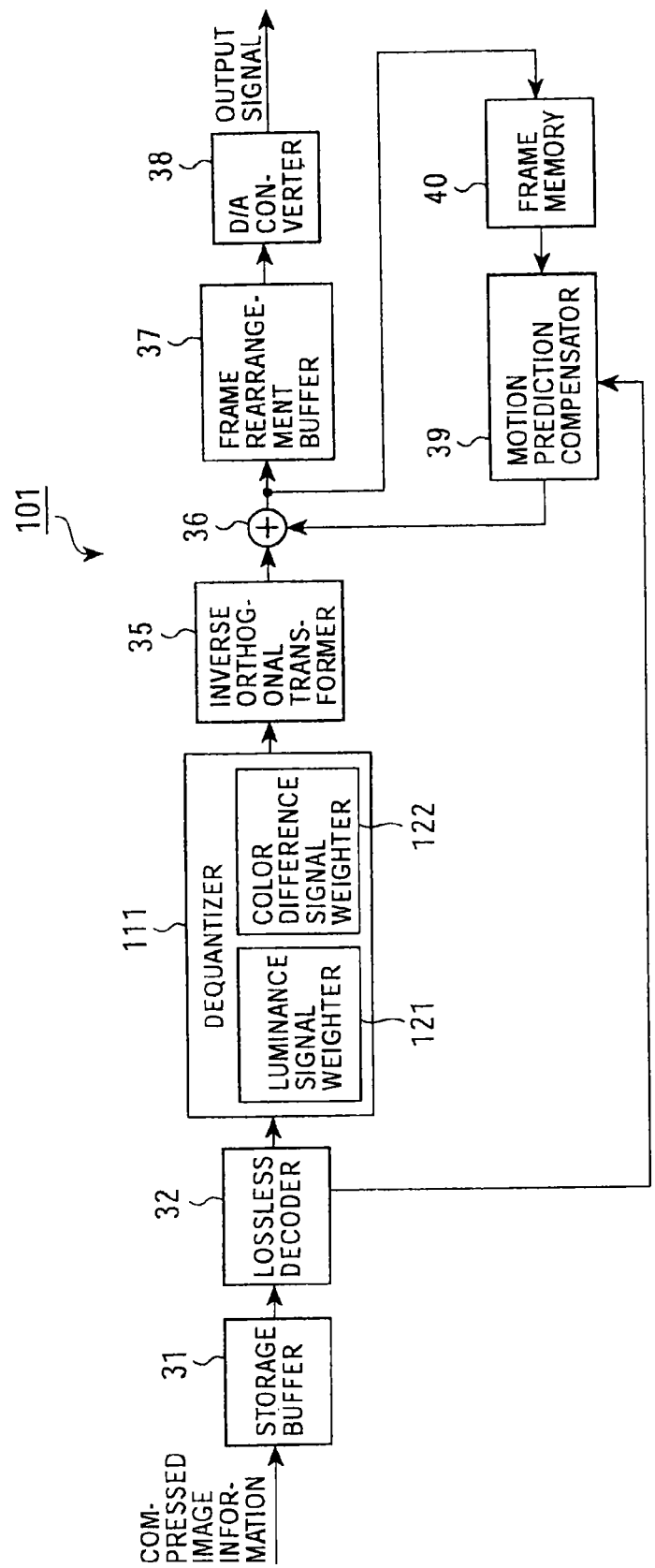
FIG. 17 is a block diagram showing another example of a construction of an image information decoding apparatus according to the present invention.

FIG. 17 shows an example of a construction of an image information decoding apparatus 101 according to the second embodiment of the present invention, in which similar parts to those of the image information decoding apparatus 30 shown in FIG. 2 are denoted by similar reference numerals.

In this construction, the dequantizer 33 shown in FIG. 2 is replaced with a dequantizer 111.

The other parts are similar to those of the image information decoding apparatus 30 shown in FIG. 2.

In contrast to the dequantizer 33 having a single weighter 34 shown in FIG. 2, the dequantizer 111 includes two weighters, that is, a luminance signal weighter 121 and a color difference signal weighter 122.

The operation of the image information coding apparatus 71 (FIG. 16) is basically similar to that of the image information coding apparatus 10 (FIG. 1) except for the operation of the color difference signal weighter 92 in the quantizer 81 and the operation of the color difference signal weighter 94 in the dequantizer 82.

The operation of the image information decoding apparatus 101 (FIG. 17) is basically similar to that of the image information decoding apparatus 30 (FIG. 2) except for the operation of the color difference signal weighter 122 in the quantizer 111.

The operation of the luminance signal weighter 91 in the quantizer 81 (FIG. 16), the operation of the luminance signal weighter 93 in the dequantizer 82 (FIG. 16), and the operation of the luminance signal weighter 121 in the dequantizer 111 (FIG. 17) are basically similar to those of the weighter 16 in the quantizer 15 (FIG. 1), the weighter 20 in the dequantizer 19 (FIG. 1), and the weighter 34 in the dequantizer 33 (FIG. 2), respectively.

That is, the luminance signal weighter 91 in the quantizer 81 (FIG. 16), the luminance signal weighter 93 in the dequantizer 82 (FIG. 16), and the luminance signal weighter 121 in the dequantizer 111 (FIG. 17) perform weighting on the luminance signal in accordance with equation (10).

However, for the purpose of distinction from equation (46) (applied to the weighting on the color difference signal), equation (10) is rewritten as equation (42).

$$QQP_{luma}(i,j)=QP_{luma}(QP)+W(i,j) \quad (42)$$

The operation of the color difference signal weighter 92 in the quantizer 81 (FIG. 16), the operation of the color difference signal weighter 94 in the dequantizer 82 (FIG. 16), and the operation of the color difference signal weighter 122 in the dequantizer 111 (FIG. 17) are basically similar to each other.

Thus, herein, only the operation of the color difference signal weighter 92 in the quantizer 81 is described.

In FIG. 16, by way of example, we assume that the quantization parameter QP associated with a macroblock input to the quantizer 81 has a value of 17 (QP=17), and a weighting matrix shown in FIG. 3 is applied to that macroblock.

In this case, calculation of equation (10) yields a value of 18 for QQP(0, 2), as can be seen from equation (43).

$$QQP(0, 2) = QP + W(0, 2) \quad (43)$$
$$= 17 + 1$$
$$= 18$$

The value of the parameter QQP(0, 2) is calculated on the basis of the parameter $QP_{luma}$ applied to the luminance signal, as described above. Thus, although the parameter $QQP_{luma}(0, 2)$ applied to the luminance signal becomes 18 as shown in FIG. 44), the parameter $QQP_{chroma}(0, 2)$ applied to the color difference signal does not become 18 but 17, as shown in equation (45) (because of the relationship between the parameter $QQP_{luma}$ and the parameter $QQP_{chroma}$ as described earlier).

$$QQP_{luma}(0,2)=18 \quad (44)$$

$$QQP_{chroma}(0,2)=17 \quad (45)$$

Therefore, the weighting process according to equation (10) cannot properly impose weighting on the color difference signal.

To avoid the above problem, the color difference signal weighter 92 performs weighting on the color difference signal in accordance with equation (46) instead of equation (10) (equation (42)).

$$QQP_{chroma}(i,j)=QP_{chroma}(QP)+W(i,j) \quad (46)$$

More specifically, in this specific example, the color difference signal weighter 92 calculates the value of the parameter $QQP_{chroma}(0, 2)$ as shown in equation (47).

$$QQP_{chroma}(0, 2) = QP_{chroma}(QP = 17) + W(0, 2) \quad (47)$$
$$= 17 + 1$$
$$= 18$$

As described above, the quantizer 81 performs weighting on the luminance signal component using the luminance signal weighter 91 and on the color difference signal component using the color difference signal weighter 92.

As described earlier, in the current H.26L standard, the upper limit of the parameter $QQP_{chroma}(i, j)$ is defined to be 26. However, when the parameter $QQP_{chroma}(i, j)$ is determined according to equation (46), the resultant value can become greater than upper limit (26).

In such a case, the color difference signal weighter 92 performs weighting according to one of two methods described below, although the method is not limited to those.

According to a first method, when the color difference signal weighter 92 calculates the value of the parameter $QQP_{chroma}$ according to equation (46), if the resultant value exceeds the upper limit (26), the calculated value (greater than 26) is not used but the value equal to the upper limit (26) is employed as the value of the parameter $QQP_{chroma}(i, j)$.

That is, if the calculated value of the parameter $QQP_{chroma}(i, j)$ is greater than 26, the color difference signal weighter 92 recalculates the value of the parameter $QQP_{chroma}(i, j)$ according to equation (48).

$$QQP_{chroma}(i,j)=26 \quad (48)$$

According to the second method, if the calculated value of the parameter $QQP_{chroma}(i, j)$ exceeds the upper limit (26), the array A ($QQP_{chroma}(i, j)$) and the array B($QQP_{chroma}(i, j)$) are extended in accordance with equations (49) and (50) for the calculated value of the parameter $QQP_{chroma}(i, j)$.

$$A(QQP_{chroma}(i, j) > 26) = \mathrm{round}\left(\frac{27}{1.12^{QQP_{chroma}(i,j)-26}}\right) \quad (49)$$

$$B(QQP_{chroma}(i, j) > 26) = \mathrm{round}(89113 \times 1.12^{QQP_{chroma}(i,j)-26}) \quad (50)$$

where round( ) denotes a round-into-integer function.

As described above, the quantizer 81 of the <image information coding apparatus 71 (FIG. 16) uses, as the quantization parameter QP, the parameter $QP_{luma}$ applied to the luminance signal and the parameter $QP_{chroma}$ applied to the color difference signal, and the quantizer 81 includes the luminance signal weighter 91 for calculating the parameter $QQP_{luma}(i, j)$ by adding a weighting array W(i, j) to the array of the parameter $QP_{luma}$ corresponding to the respective components of the luminance signal in each block (in accordance with equation (10) or (42)) and also includes the color difference signal weighter 92 for calculating the parameter $QQP_{chroma}(i, j)$ by adding the array W(i, j) to the array of the parameter $QP_{chroma}$ corresponding to the respective components of the color difference signal in each block (in accordance with equation (46)), wherein the quantizer 81 performs weighted quantization using the parameter $QQP_{luma}(i, j)$ calculated by the luminance signal weighter 91 and the parameter $QQP_{chroma}(i, j)$ calculated by the color difference signal weighter 92.

When the parameter $QQP_{chroma}(i, j)$ calculated by the color difference signal weighter 92 exceeds the predetermined upper limit $QQP_{chroma\_max}$ (26 in the present example), the quantizer 81 performs weighted quantization in accordance with one of methods described below.

In a first method, the quantizer 81 performs weighted quantization using a value equal to the upper limit $QQP_{chroma\_max}$ as the parameter $QQP_{chroma}(i, j)$.

In the second method, in the case in which coding of an input image signal is performed such that two arrays A(QP) and B(QP) corresponding to the parameter QP and having the following relationship (51) are prepared $$A(QP) \times B(QP) = \mathrm{Const} \text{ (where Const denotes a constant)} \quad (51)$$

the quantization is performed in accordance with the following formula (52)

$$\mathrm{LEVEL}=(K \times A(QP)+f \times 2^m)/2^m \quad (52)$$

where K denotes an unquantized orthogonal transform coefficient, m denotes a predetermined integer, f denotes a rounding constant, LEVEL denotes a quantized output, dequantization corresponding to the quantization is to be performed in accordance with the following formula (53)

$$(53) \quad K'=\mathrm{LEVEL} \times B(QP)$$

where K' denotes a dequantized orthogonal transform coefficient, the quantizer 81 performs quantization such that
a common ration r is calculated in accordance with the following formula (54)

$$\frac{A(QP)}{A(QP+1)} = \frac{B(QP+1)}{B(QP)} = r \quad (54)$$

a variable $A(QQP_{chroma}(i, j) > QQP_{chroma\_max}$ and a variable $B(QQP_{chroma}(i, j) > QQP_{chroma\_max}$ are respectively calculated in accordance with the following formulas (55) and (56)

$$A(QQP_{chroma}(i, j) > QQP_{chroma\_max}) = \quad (55)$$
$$\text{round}\left(\frac{A(QQP_{chroma\_max})}{r^{QQP_{chroma}(i,j) - QQP_{chroma\_max}}}\right)$$

$$B(QQP_{chroma}(i, j) > QQP_{chroma\_max}) = \quad (56)$$
$$\text{round}(A(QQP_{chroma\_max}) \times r^{QQP_{chroma}(i,j) - QQP_{chroma\_max}})$$

where round( ) denotes a round-into-integer function, and
the quantization is performed in accordance with the following formula (57)

$$\text{LEVEL} = (K \times A(QQP_{chroma}(i,j) > QQP_{chroma\_max}) + f \times 2^m)/2^m.$$

As with the quantizer 81 (FIG. 16), the dequantizer 82 (FIG. 16) and the dequantizer 111 (FIG. 17) also use as the quantization parameter QP, the parameter $QP_{luma}$ applied to the luminance signal and the parameter $QP_{chroma}$ applied to the color difference signal, and they include the luminance signal weighter 93 or 121 for calculating the parameter $QQP_{luma}(i, j)$ by adding a weighting array W(i, j) to the array of the parameter $QP_{luma}$ corresponding to the respective components of the luminance signal in each block (in accordance with equation (10) or (42)) and also include the color difference signal weighter 94 or 122 for calculating the parameter $QQP_{chroma}(i, j)$ by adding the array W(i, j) to the array of the parameter $QP_{chroma}$ corresponding to the respective components of the color difference signal in each block (in accordance with equation (46)), wherein the dequantizers 82 and 111 perform weighted dequantization using the parameter $QQP_{luma}(i, j)$ calculated by the luminance signal weighter 93 or 121 and the parameter $QQP_{chroma}(i, j)$ calculated by the color difference signal weighter 94 or 122.

When the parameter $QQP_{chroma}(i, j)$ calculated by the color difference signal weighter 94 or 122 exceeds the predetermined upper limit $QQP_{chroma\_max}$ (26 in the present example), the dequantizer 82 or 111 performs weighted dequantization in accordance with one of methods described above.

Thus, in the image information coding apparatus 71 and the image information decoding apparatus 101, weighting on the color difference signal is possible even in the case in which the quantization parameter $QP_{luma}$ applied to the luminance signal and the quantization parameter $QP_{chroma}$ applied to the color difference signal can have different values as with the process according to the H.26L standard, and those values are represented by a single parameter QP described in compressed image information.

The technique disclosed in the second embodiment may be applied not only to the image information coding apparatus 71 and the image information decoding apparatus 101 but also to apparatuses according to the first embodiment described earlier.

For example, the technique may be applied to the image information coding apparatus according to the first modification of the first embodiment so as to include a quantizer for quantizing an input image signal by dividing the input image signal into first blocks, performing a first orthogonal transform on the first blocks on a block-by-block basis, forming second blocks including only DC components of orthogonal transform coefficients obtained via the first orthogonal transform, and performing a second orthogonal transform on the second blocks; and quantizing the coefficients of AC components obtained via the first orthogonal transform and quantizing the coefficients of the DC component obtained via the second orthogonal transform, wherein, in the quantization, coefficients of the AC components obtained via the first orthogonal transform are weighted differently from the coefficients of the DC components obtained via the second orthogonal transform.

That is, in this image information coding apparatus based on the first embodiment, in the quantization performed on the coefficients of AC components obtained via the first orthogonal transform, the quantization is performed using a parameter QP specifying one of elements of a series of numbers arranged according to a predetermined rule in correspondence with quantization step sizes, and in the quantization performed on the coefficients of DC components obtained via the second orthogonal transform, weighted quantization is performed using a parameter QQP obtained by adding a predetermined parameter X to the parameter QP.

Furthermore, the technique disclosed in the second embodiment may be applied to the image information coding apparatus according to the first embodiment as described below.

A quantizer (not shown but having a similar structure to that of the quantizer 81 shown in FIG. 16) performs quantization of the coefficients of AC components using, as the parameter QP, a parameter $QP_{luma}$ for a luminance signal and a parameter $QP_{chroma}$ for a color difference signal. The quantizer includes a luminance signal weighter (not shown but having a similar structure to the luminance signal weighter 91 shown in FIG. 16) for calculating, as the parameter QQP, the parameter $QQP_{luma}(i, j)$ by adding a weighting array W(i, j) as the parameter X to the array of the parameter $QP_{luma}$ corresponding to the respective components of the luminance signal in each block, and the quantizer also includes a color difference signal weighter (not shown but having a similar structure to the color difference signal weighter 92 shown in FIG. 16) for calculating, as the parameter QQP, the parameter $QQP_{chroma}(i, j)$ by adding the weighting array W(i, j) as the parameter X to the array of the parameter $QP_{chroma}$ corresponding to the respective components of the color difference signal in each block. The quantizer performs weighted quantization of the coefficients of DC components, using the parameter $QQP_{luma}(i, j)$ calculated by the luminance signal weighter and the parameter $QQP_{chroma}(i, j)$ calculated by the color difference signal weighter.

When the parameter $QQP_{chroma}(i, j)$ calculated by the color difference signal weighter exceeds the predetermined upper limit $QQP_{chroma\_max}$ (26 in the present example), the quantizer performs weighted quantization of DC components in accordance with one of methods described above.

Similarly, an image information decoding apparatus (not shown) corresponding to the above-described image information coding apparatus may be constructed as follows.

A dequantizer (not shown but having a similar structure to the dequantizer 111 shown in FIG. 17) performs dequantization of the coefficients of AC components using, as the parameter QP, a parameter $QP_{luma}$ for the luminance signal and a parameter $QP_{chroma}$ for the color difference signal. The dequantizer includes a luminance signal weighter (not shown but having a similar structure to the luminance signal weighter 121 shown in FIG. 17) for calculating, as the parameter QQP, the parameter $QQP_{luma}(i, j)$ by adding a weighting array $W(i, j)$ as the parameter X to the array of the parameter $QP_{luma}$ corresponding to the respective components of the luminance signal in each block, and the dequantizer also includes a color difference signal weighter (not shown but having a similar structure to the color difference signal weighter 122 shown in FIG. 17) for calculating, as the parameter QQ, the parameter $QQP_{chroma}(i, j)$ by adding the weighting array $W(i, j)$ as the parameter X to the array of the parameter $QP_{chroma}$ corresponding to the respective components of the color difference signal in each block. The dequantizer performs weighted dequantization of the coefficients of DC component, using the parameter $QQP_{luma}(i, j)$ calculated by the luminance signal weighter and the parameter $QQP_{chroma}(i, j)$ calculated by the color difference signal weighter.

When the parameter $QQP_{chroma}(i, j)$ calculated by the color difference signal weighter exceeds the predetermined upper limit $QQP_{chroma\_max}$ (26 in the present example), the dequantizer performs weighted dequantization of DC components in accordance with one of methods described above.

An image information coding and transmitting system according to the second embodiment corresponding to the image information coding and transmitting system 51 according to the first embodiment shown in FIG. 13 may be realized by replacing the image signal coder 51 shown in FIG. 13 with an image signal coder 71 shown in FIG. 16.

The above-described process according to the first or second embodiment may be performed by hardware or software.

Figure 18:
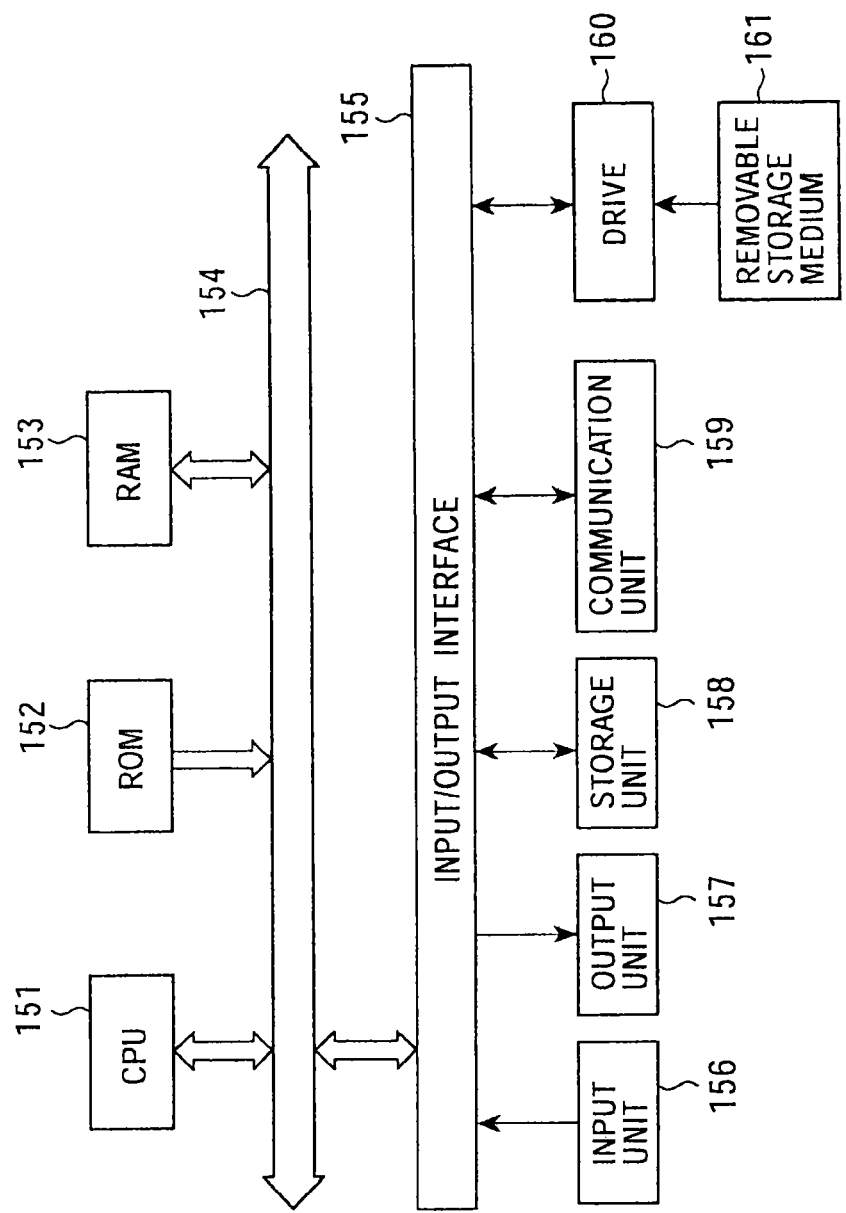
FIG. 18 is a block diagram showing another example of a construction of an image information coding apparatus or an image information coding apparatus according to the present invention.
Figure 19:
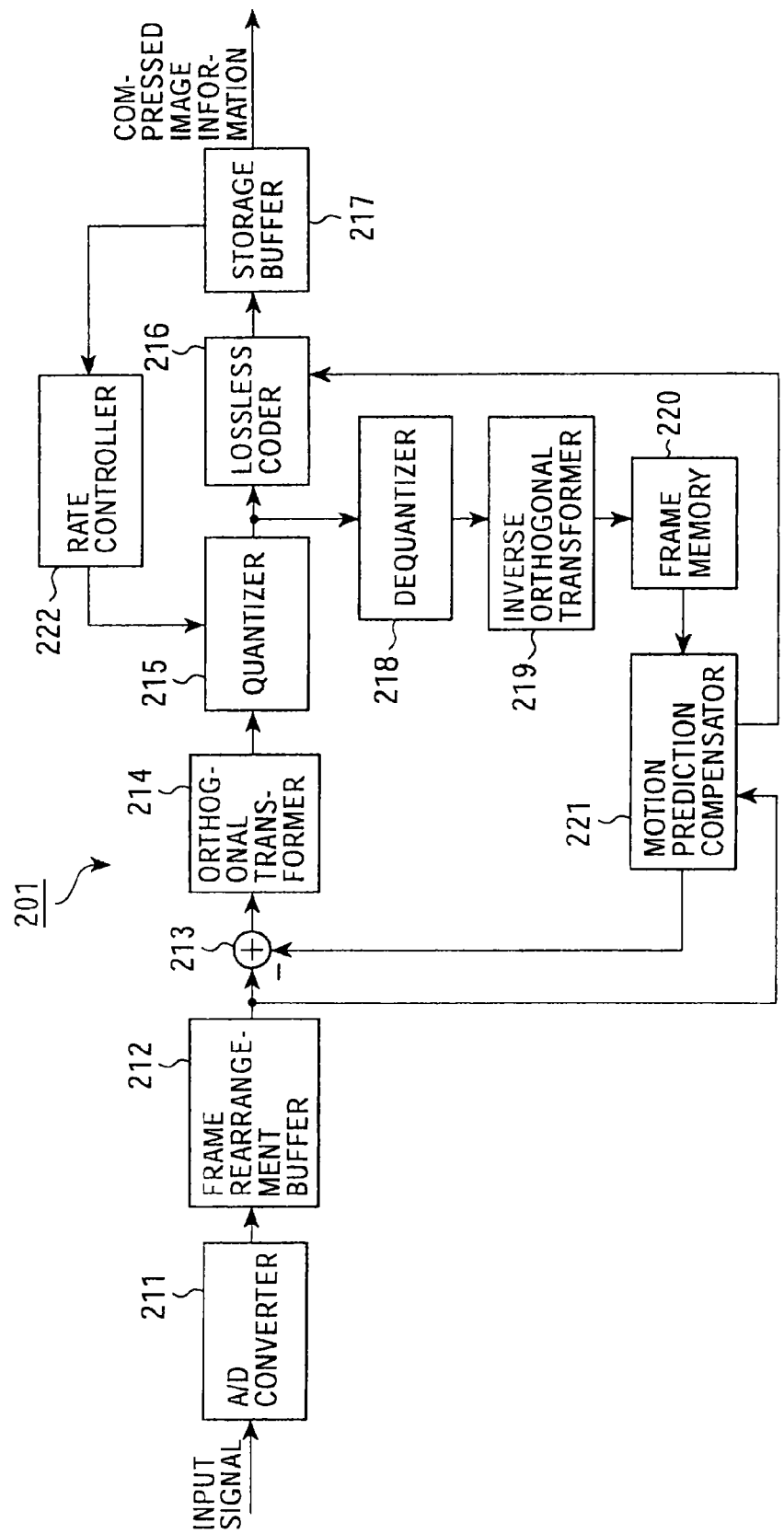
FIG. 19 is a block diagram showing an example of a construction of an image information coding apparatus according to a conventional technique.
Figure 20:
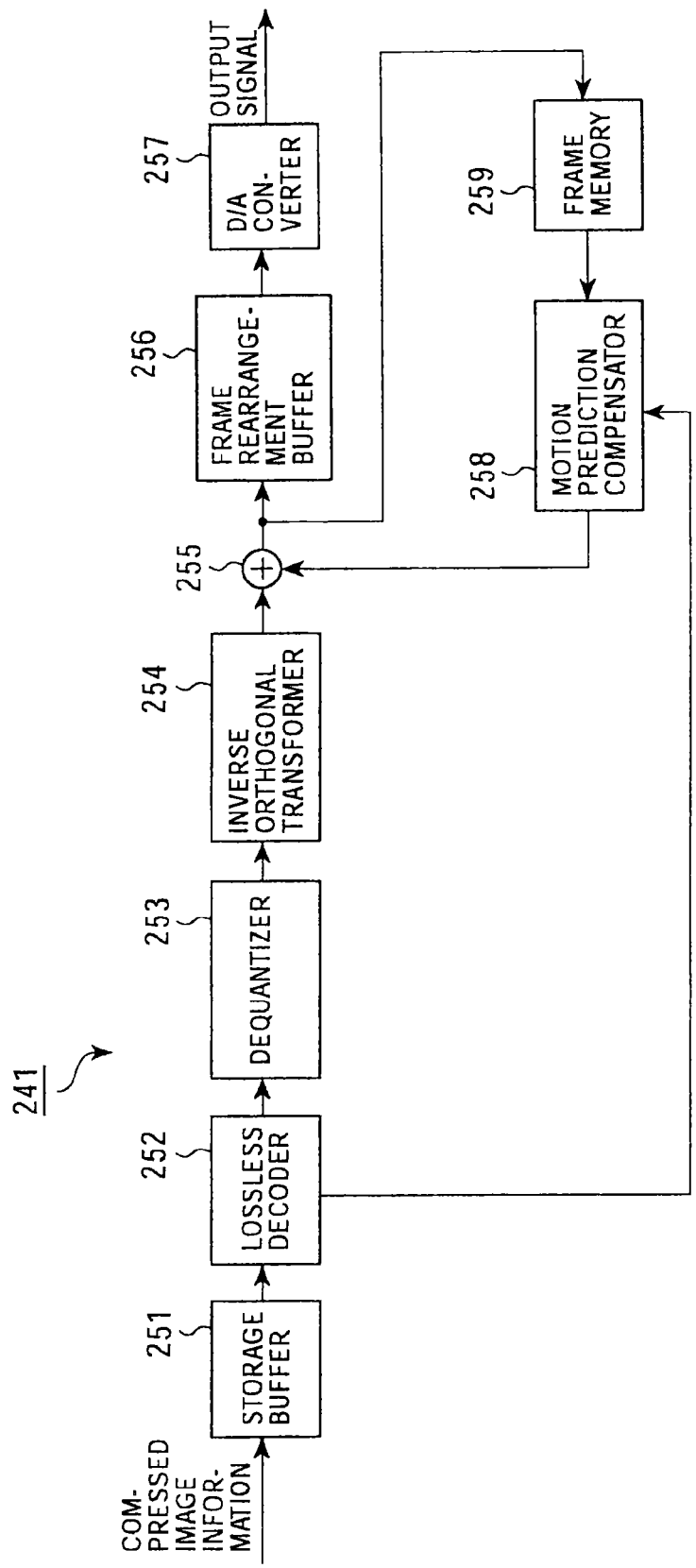
FIG. 20 is a block diagram showing an example of a construction of an image information decoding apparatus according to a conventional technique.

In the case in which the process is performed by software, the image information coding apparatus or the image information decoding apparatus may be realized, for example, by a personal computer such as that shown in FIG. 18.

As shown in FIG. 18, a CPU (Central Processing Unit) 151 performs various processes in accordance with a program stored in a ROM (Read Only Memory) 152 or in accordance with a program loaded into a RAM (Random Access Memory) 153 from a storage unit 158. The RAM 153 is also used to stored data necessary for the CPU 151 to perform the processes.

The CPU 151, the ROM 152, and the RAM 153 are connected to each other via a bus 154. The bus 154 is also connected to an input/output interface 155.

The input/output interface 155 is connected to an input unit 156 including a keyboard, a mouse, and/or the like, an output unit 157 including a display or the like, the storage unit 158 including a hard disk or the like, and a communication unit 159 including a modem, a terminal adapter, and/or the like. The communication unit 159 allows communication with other information processing apparatuses via networks including the Internet.

The input/output interface 155 is connected to a drive 160, as required. A removable storage medium 161 such as a magnetic disk, an optical disk, a magnetooptical disk, or a semiconductor memory is mounted on the drive 160 as required, and a computer program is read from the removable storage medium 161 and installed into the storage unit 158, as required.

When the processing sequence is executed by software, a program forming the software may be installed from a storage medium onto a computer which is provided as dedicated hardware or may be installed onto a general-purpose computer capable of performing various processes in accordance with various programs installed thereon.

Specific examples of storage media usable for the above purpose include, as shown in FIG. 18, a removable storage medium (a package medium) 161 such as a magnetic disk (such as a floppy disk), an optical disk (such as a CD-ROM (Compact Disk-Read Only Memory) and a DVD (Digital Versatile Disk)), a magnetooptical disk (such as an MD (Mini-Disk, trademark)), and a semiconductor memory, on which a program is stored and which is supplied to a user separately from a computer. A program may also be supplied to an user by preinstalling it on a built-in ROM 152 or a storage unit 158 such as a hard disk disposed in the computer.

Some examples of programs are described below, although the programs are not limited to those.

A first image information coding program according to the first embodiment of the present invention is a program for causing the CPU 151 shown in FIG. 18 to execute coding including the steps of dividing an input image signal into blocks, performing an orthogonal transform on the blocks on a block-by-block basis, and quantizing orthogonal transform coefficients, wherein, in the quantization, weighting is performed for each component of the orthogonal transform coefficients by means of an addition operation on a parameter QP specifying one of elements of a series of numbers arranged in accordance with a predetermined rule in correspondence with quantization step sizes.

In this first image information coding program, an array A(QP) consisting of elements having values which increase or decrease by a % with increasing of the value of the parameter QP by 1 is used as the sequence of numbers corresponding to the quantization step sizes, and the quantization is performed such that the orthogonal transform coefficients K are multiplied by the values of the array A(QP) and the resultant product is quantized.

Furthermore, in this first image information coding program, when the parameter QP exceeds an upper limit or a lower limit, the array A(QP) is extended so as to have an extended value or values determined on the basis of the increasing or decreasing ratio of the original array A(QP), and the extended value or values of the A(QP) are used for the exceeding value or values of the parameter QP.

Furthermore, in this first image information coding program, the quantization is performed such that the orthogonal transform coefficient is first multiplied by the value of the array A(QP) and then the resultant product is quantized, wherein QP is a parameter specifying one of elements of a series of numbers arranged in accordance with a predetermined rule in correspondence with quantization step sizes and the value of the array A(QP) increases or decreases by $\alpha$% with increasing of the value of the parameter QP by 1.

When the parameter QP exceeds an upper limit or a lower limit, the array A(QP) may be extended so as to have an extended value or values determined on the basis of the increasing or decreasing ratio of the original array A(QP), and the extended value or values of the A(QP) may be used for the exceeding value or values of the parameter QP.

Thus, it becomes possible to use greater quantization step sizes in quantizing orthogonal transform coefficients in the high frequency range in which the great quantization step sizes does not result in significant visually-perceptible degradation, than in the low frequency range in which degradation is easily perceptible. Furthermore, it becomes possible to prevent a spurious contour line from being created in an image including a part with gradually varying pixel values and it also becomes possible to perform high-efficient compression at low bit rates.

An example of a second image information coding program corresponding to the first image information coding program according to the first embodiment is described below.

According to this program, the parameter QP may include a parameter $QP_{luma}$ applied to a luminance signal and a parameter $QP_{chroma}$ applied to a color difference signal; and the quantization is performed by the CPU 151 shown in FIG. 18 such that a parameter $QQP_{luma}(i, j)$ is calculated by adding a weighting array $W(i, j)$ to the array of the parameter $QP_{luma}$ corresponding to the respective components of the luminance signal of each block, a parameter $QQP_{chroma}(i, j)$ is calculated by adding the weighting array $W(i, j)$ to the array of the parameter $QP_{chroma}$ corresponding to the respective components of the color difference signal of each block, and weighted dequantization is performed using the resultant parameter $QQP_{luma}(i, j)$ and the resultant parameter $QQP_{chroma}(i, j)$ When the parameter $QQP_{chroma}(i, j)$ obtained via the calculation exceeds the predetermined value $QQP_{chroma\_max}$, the CPU 151 shown in FIG. 18 performs one of two processes corresponding to the above-described two methods.

That is, the CPU 151 shown in FIG. 18 performs weighted quantization using the predetermined value $QQP_{chroma\_max}$ as the parameter $QQP_{chroma}(i, j)$ or performs a process such that two arrays $A(QP)$ and $B(QP)$ corresponding to the parameter QP and having the following relationship are prepared $$A(QP) \times B(QP) = \text{Const, where Const denotes a constant,}$$

the quantization is performed in accordance with the following formula $$\text{LEVEL} = (K \times A(QP) + f \times 2^m)/2^m$$

where K denotes an unquantized orthogonal transform coefficient, m denotes a predetermined integer, f denotes a rounding constant, LEVEL denotes a quantized output, dequantization corresponding to the quantization is to be performed in accordance with the following formula $$K' = \text{LEVEL} \times B(QP)$$

where K' denotes a dequantized orthogonal transform coefficient, a common ration is calculated in accordance with the following formula $$\frac{A(QP)}{A(QP+1)} = \frac{B(QP+1)}{B(QP)} = r$$

a variable $A(QQP_{chroma}(i, j) > QQP_{chroma\_max})$ and a variable $B(QQP_{chroma}(i, j) > QQP_{chroma\_max})$ are respectively calculated in accordance with the following formulas $$A(QQP_{chroma}(i, j) > QQP_{chroma\_max}) = \text{round}\left(\frac{A(QQP_{chroma\_max})}{r^{QQP_{chroma}(i,j) - QQP_{chroma\_max}}}\right)$$

$$B(QQP_{chroma}(i, j) > QQP_{chroma\_max}) = \text{round}\left(A(QQP_{chroma\_max}) \times r^{QQP_{chroma}(i,j) - QQP_{chroma\_max}}\right)$$

where round( ) denotes a round-into-integer function, and the quantization is performed in accordance with the following formula $$\text{LEVEL} = (K \times A(QQP_{chroma}(i,j) > QQP_{chroma\_max}) + f \times 2^m)/2^m.$$

This makes it possible to perform weighting on the color difference signal in a case in which the quantization parameter $QP_{luma}$ applied to the luminance signal and the quantization parameter $QP_{chroma}$ applied to the color difference signal can have different values as with the process according to the H.26L standard, and those values are represented by a single parameter QP in compressed image information.

A second image information coding program according to the first embodiment of the present invention is a program for causing a computer to execute a process including the steps of dividing an input image signal into first blocks, performing a first orthogonal transform on the first blocks on a block-by-block basis, forming second blocks including only DC components of orthogonal transform coefficients obtained via the first orthogonal transform, and performing a second orthogonal transform on the second blocks; and quantizing the coefficients of AC components obtained via the first orthogonal transform and quantizing the coefficients of the DC component obtained via the second orthogonal transform, wherein, in the quantization, coefficients of the AC components obtained via the first orthogonal transform are weighted differently from the coefficients of the DC components obtained via the second orthogonal transform.

In this second image information coding program, coefficients of DC components obtained via the first orthogonal transform are extracted, and the second orthogonal transform is performed on the extracted coefficients, and the coefficients of AC components obtained via the first orthogonal transform and the coefficients of DC components obtained via the second orthogonal transform are quantized in weighted fashion such that the coefficients of AC components are weighted differently from the coefficients of DC components.

This allows improvement in accuracy of the DC components which are important to obtain high image quality, while allowing reduction in the amount of information associated with AC components, thereby achieving high coding efficiency.

An example of a second image information coding program corresponding to the second image information coding program according to the first embodiment is described below.

That is, according to the program, the CPU 151 shown in FIG. 18 executes quantization of the coefficients of AC components, as the parameter QP, a parameter $QP_{luma}$ for a luminance signal and a parameter $QP_{chroma}$ for a color difference signal, and executes quantization of the coefficients of DC components using, as the parameter QQP, a parameter $QQP_{luma}(i, j)$ for the luminance signal and a parameter $QQP_{chroma}(i, j)$ for the color difference signal, wherein the parameter $QQP_{luma}(i, j)$ is calculated by adding a weighting array $W(i, j)$ to the array of the parameter $QP_{luma}$ corresponding to the respective components of the luminance signal of each block, and the parameter $QQP_{chroma}(i, j)$ is calculated by adding the weighting array $W(i, j)$ to the array of the parameter $QP_{chroma}$ corresponding to the respective components of the color difference signal of each block.

When the parameter $QQP_{chroma}(i, j)$ obtained via the calculation exceeds the predetermined value $QQP_{chroma\_max}$, the CPU 151 shown in FIG. 18 performs one of two processes corresponding to the above-described two methods.

That is, the CPU 151 shown in FIG. 18 performs quantization on DC components using the predetermined value $QQP_{chroma\_max}$ as the parameter $QQP_{chroma}(i, j)$ or performs a process such that two arrays A(QP) and B(QP) corresponding to the parameter QP and having the following relationship are prepared $A(QP) \times B(QP) =$ Const, where Const denotes a constant, quantization of the coefficients of AC components is performed in accordance with the following formula LEVEL=$(K \times A(QP) + f \times 2^m)/2^m$ where K denotes an unquantized orthogonal transform coefficient, m denotes a predetermined integer, f denotes a rounding constant, LEVEL denotes a quantized output, dequantization corresponding to the quantization is to be performed in accordance with the following formula $K' = $LEVEL$\times B(QP)$ where K' denotes a dequantized orthogonal transform coefficient, a common ration is calculated in accordance with the following formula $$\frac{A(QP)}{A(QP+1)} = \frac{B(QP+1)}{B(QP)} = r$$

a variable $A(QQP_{chroma}(i, j) > QQP_{chroma\_max})$ and a variable $B(QQP_{chroma}(i, j) > QQP_{chroma\_max})$ are respectively calculated in accordance with the following formulas $$A(QQP_{chroma}(i, j) > QQP_{chroma\_max}) = \text{round}\left(\frac{A(QQP_{chroma\_max})}{r^{QQP_{chroma}(i,j) - QQP_{chroma\_max}}}\right)$$

$$B(QQP_{chroma}(i, j) > QQP_{chroma\_max}) = \text{round}\left(A(QQP_{chroma\_max}) \times r^{QQP_{chroma}(i,j) - QQP_{chroma\_max}}\right)$$

where round( ) denotes a round-into-integer function, and
the quantization is performed in accordance with the following formula LEVEL=$(K \times A(QQP_{chroma} > QQP_{chroma\_max}) + f \times 2^m)/2^m$.

This makes it possible to perform weighting on the color difference signal in a case in which the quantization parameter $QP_{luma}$ applied to the luminance signal and the quantization parameter $QP_{chroma}$ applied to the color difference signal can have different values as with the process according to the H.26L standard, and those values are represented by a single parameter QP in compressed image information.

A first image information decoding program according to the first embodiment of the present invention causes the CPU 151 shown in FIG. 18 to execute a process of decoding compressed image information which has been coded via a process including the steps of dividing an input image signal into blocks, performing an orthogonal transform on the blocks on a block-by-block basis, and quantizing resultant orthogonal transform coefficients, wherein, in the dequantization, weighted dequantization is performed on each component of the quantized coefficients by means of an addition operation on a parameter QP specifying one of elements of a series of numbers arranged in accordance with a predetermined rule in correspondence with quantization step sizes.

In the first image information decoding program, an array B(QP) consisting of elements having values which increase or decrease by β% with increasing of the value of the parameter QP by 1 may be used as the sequence of numbers corresponding to the quantization step sizes, and the dequantization is performed by multiplying the quantized coefficients by the values of the array B(QP).

In this first image information decoding program, when the parameter QP exceeds an upper limit or a lower limit, the array B(QP) is extended so as to have an extended value or values determined on the basis of the increasing or decreasing ratio of the original array B(QP), and the extended value or values of the B(QP) are used for the exceeding value or values of the parameter QP.

That is, in the first image information decoding program, the dequantization is performed such that the quantized coefficient is multiplied by the value of the array B(QP), wherein QP is a parameter specifying one of elements of a series of numbers arranged in accordance with a predetermined rule in correspondence with quantization step sizes, and the value of the array B(QP) increases or decreases by β% with increasing of the value of the parameter QP by 1.

When the parameter QP exceeds an upper limit or a lower limit, the array B(QP) may be extended so as to have an extended value or values determined on the basis of the increasing or decreasing ratio of the original array B(QP), and the extended value or values of the B(QP) may be used for the exceeding value or values of the parameter QP.

Thus, in decoding of compressed image information, it becomes possible to use greater quantization step sizes in dequantizing orthogonal transform coefficients in the high frequency range in which the great quantization step sizes does not result in significant visually-perceptible degradation, than in the low frequency range in which degradation is easily perceptible.

An example of a second image information decoding program corresponding to the first image information decoding program according to the first embodiment is described below.

That is, in this program, the parameter QP may include a parameter $QP_{luma}$ applied to a luminance signal and a parameter $QP_{chroma}$ applied to a color difference signal; and the dequantization is performed by the CPU 151 shown in FIG. 18 such that a parameter $QQP_{luma}(i, j)$ is calculated by adding a weighting array W(i, j) to the array of the parameter $QP_{luma}$ corresponding to the respective components of the luminance signal of each block, a parameter $QQP_{chroma}(i, j)$ is calculated by adding the weighting array W(i, j) to the array of the parameter $QP_{chroma}$ corresponding to the respective components of the color difference signal of each block, and weighted dequantization is performed using the resultant parameter $QQP_{luma}(i, j)$ and the resultant parameter $QQP_{chroma}(i, j)$.

When the parameter $QQP_{chroma}(i, j)$ obtained via the calculation exceeds the predetermined value $QQP_{chroma\_max}$, the CPU 151 shown in FIG. 18 performs one of two processes corresponding to the above-described two methods.

The second image information decoding program according to the first embodiment of the present invention may cause the CPU 151 shown in FIG. 18 to execute a process of decoding image information which has been coded via a process including the steps of dividing an input image signal into first blocks, performing a first orthogonal transform on the first blocks on a block-by-block basis, forming second blocks including only DC components of orthogonal transform coefficients obtained via the first orthogonal transform, and performing a second orthogonal transform on the second blocks; and quantizing the coefficients of AC components obtained via the first orthogonal transform and the coefficients of DC components obtained via the second orthogonal transform such that the coefficients of the AC components obtained via the first orthogonal transform were weighted differently from the coefficients of the DC components obtained via the second orthogonal transform, wherein the decoding process includes the step of dequantizing the quantized coefficients of AC components and the coefficients of DC components quantized after completion of the second orthogonal transform such that the quantized coefficients of AC components and the coefficients of DC components are weighted differently by amounts corresponding to the weights employed in the quantization.

In the second image information decoding program, when a compressed image information is given which has been coded such that coefficients of DC components obtained via the first orthogonal transform were extracted, and the second orthogonal transform was performed on the extracted coefficients, and the coefficients of AC components obtained via the first orthogonal transform and the coefficients of DC components obtained via the second orthogonal transform were quantized in weighted fashion such that the coefficients of AC components were weighted differently from the coefficients of DC components, the dequantization of the given image information is performed such that the quantized coefficients of AC components and the coefficients of DC components quantized after being subjected to the second orthogonal transform are respectively dequantized with different weights corresponding to the weights employed in the quantization.

This allows improvement in accuracy of the DC components which are important to obtain high image quality, while allowing reduction in the amount of information associated with AC components.

An example of a second image information coding program corresponding to the second image information coding program according to the first embodiment is described below.

That is, according to the program, the CPU 151 shown in FIG. 18 executes dequantization of the coefficients of AC components using, as the parameter QP, a parameter $QP_{luma}$ for a luminance signal and a parameter $QP_{chroma}$ for a color difference signal, and executes quantization of the coefficients of DC components using, as the parameter QQP, a parameter $QQP_{luma}(i, j)$ for the luminance signal and a parameter $QQP_{chroma}(i, j)$ for the color difference signal, wherein the parameter $QQP_{luma}(i, j)$ is calculated by adding a weighting array $W(i, j)$ to the array of the parameter $QP_{luma}$ corresponding to the respective components of the luminance signal of each block, and the parameter $QQP_{chroma}(i, j)$ is calculated by adding the weighting array $W(i, j)$ to the array of the parameter $QP_{chroma}$ corresponding to the respective components of the color difference signal of each block.

When the parameter $QQP_{chroma}(i, j)$ obtained via the calculation exceeds the predetermined value $QQP_{chroma\_max}$, the CPU 151 shown in FIG. 18 performs one of two processes corresponding to the above-described two methods.

The techniques disclosed in the present invention may be applied to various transform schemes. That is, the techniques may be employed regardless of the calculation accuracy or the integer transform matrix.

Furthermore, the present invention may be employed regardless of the transform block size. The invention may also be applied to an adaptive variable block size transform in which the frequency transform is performed while adaptively changing the block size among 4×4, 4×8, 8×4, 8×8, and 16×16.

Although the present invention has been described above with reference to specific embodiments, the invention is not limited to those embodiments, but various modifications are possible without departing from the scope of the invention.

In the present description, the steps described in the program stored in the storage medium may be performed either in time sequence in accordance with the order described in the program or in a parallel or separate fashion.

In the present description, the term "system" is used to represent an entire set of apparatuses or processing units.

As described above, the present invention provide the great advantage that a spurious contour line is prevented from being created in an image including a part with gradually varying pixel values and it becomes possible to perform high-efficient compression at low bit rates. Furthermore, it is possible to perform weighting on the color difference signal even in the case in which the quantization parameter $QP_{luma}$ applied to the luminance signal and the quantization parameter $QP_{chroma}$ applied to the color difference signal can have different values, which can occur in the process according to the H.26L standard, and those values are represented by a single parameter QP in compressed image information.

The invention claimed is:
1. A decoding method for decoding a bit stream in an image decoding apparatus, the method comprising:
   decoding, in a decoding unit in the image decoding apparatus, the bit stream, and generating a luma component of quantized coefficients and a chroma component of quantized coefficients; and
   performing, in a dequantization unit in the image decoding apparatus, dequantization on the luma component of quantized coefficients and the chroma component of quantized coefficients using a chroma quantization parameter calculated on the basis of a luma quantization parameter weighted by an addition operation.
2. An image decoding apparatus for decoding a bit stream, the apparatus comprising:
   a decoding unit that decodes the bit stream and generates a luma component of quantized coefficients and a chroma component of quantized coefficients; and
   a dequantization unit configured to perform dequantization on the luma component of quantized coefficients and the chroma component of quantized coefficients using a chroma quantization parameter calculated on the basis of a luma quantization parameter weighted by an addition operation.

* * * * *